United States Patent
Takizawa et al.

(10) Patent No.: US 6,785,897 B2
(45) Date of Patent: Aug. 31, 2004

(54) DISC SUPPORT PLATE, DISC CHANGER MECHANISM, AND DISC RECORDING AND/OR REPRODUCING DEVICE

(75) Inventors: Kazuyuki Takizawa, Chiba (JP); Tomohiro Watanabe, Kanagawa (JP); Toru Hama, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 09/783,997

(22) Filed: Feb. 16, 2001

(65) Prior Publication Data
US 2001/0028627 A1 Oct. 11, 2001

(30) Foreign Application Priority Data

Feb. 21, 2000 (JP) ........................................ 2000-042836

(51) Int. Cl.⁷ ............................................ G11B 17/03
(52) U.S. Cl. ........................................ 720/601
(58) Field of Search .............................. 369/191, 192, 369/75.1, 77.1, 263, 264, 178; 720/601

(56) References Cited

U.S. PATENT DOCUMENTS

| | | | | |
|---|---|---|---|---|
| 4,653,039 A | * | 3/1987 | Ueno et al. | 369/77.1 |
| 5,695,561 A | * | 12/1997 | Tomiyama et al. | 118/620 |
| 6,009,060 A | * | 12/1999 | Kim | 369/77.1 |
| 6,307,828 B1 | * | 10/2001 | Goto et al. | 369/178 |

FOREIGN PATENT DOCUMENTS

| | | | | |
|---|---|---|---|---|
| JP | 04062480 | * | 10/1993 | ............... 369/292 |
| JP | (8-161848) | * | 6/1996 | |
| JP | 2000344353 | * | 12/2000 | |
| JP | 2001332077 | * | 11/2001 | |

* cited by examiner

Primary Examiner—Allen Cao
(74) Attorney, Agent, or Firm—Oblon, Spivak, McClelland, Maier & Neustadt, P.C.

(57) ABSTRACT

A tray includes a substrate and a resin portion placed thereon by printing. The resin portion includes a first part placed along an edge on the disc loading side of the substrate, a second part placed along another edge on the disc unloading side of the substrate, and a third part placed between the first and second parts.

14 Claims, 39 Drawing Sheets

DISC LOADING DIRECTION

DISC LOADING DIRECTION

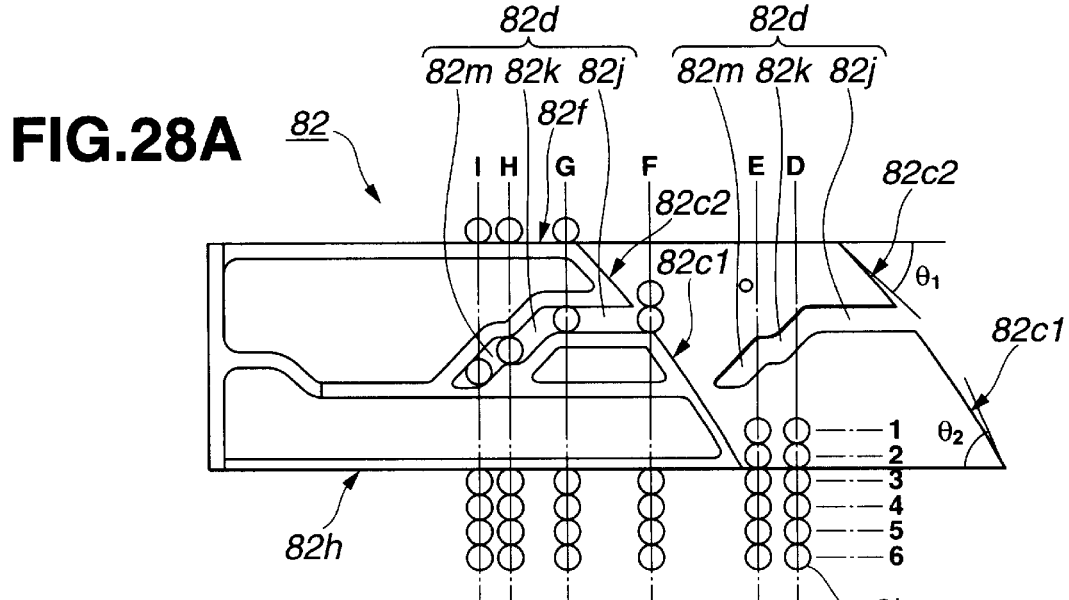
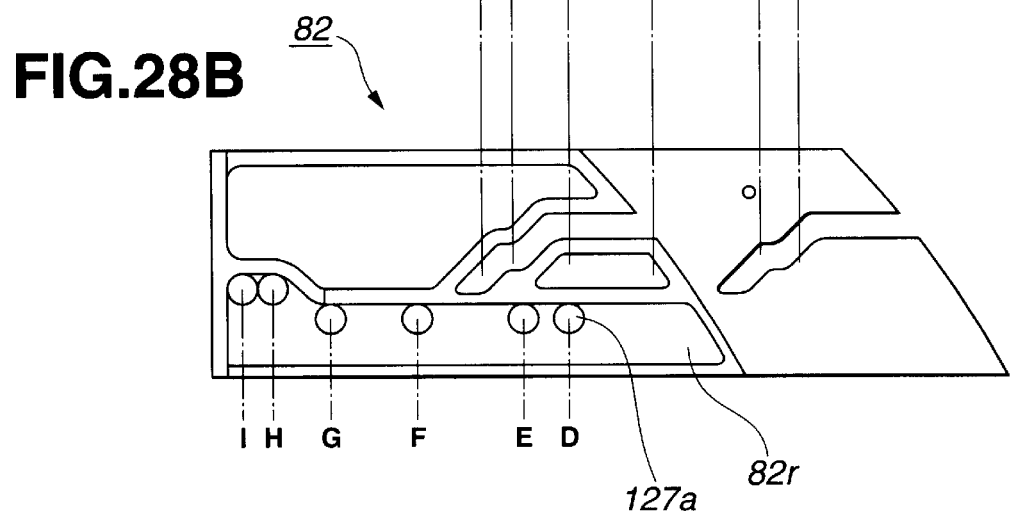

DISC SUPPORT PLATE, DISC CHANGER MECHANISM, AND DISC RECORDING AND/OR REPRODUCING DEVICE

BACKGROUND OF THE INVENTION

The present invention relates to a disc support plate, such as a tray, for holding a disc. The present invention also relates to a disc changer mechanism and a disc recording and/or reproducing device including such disc support plate.

One of the disc recording and/or reproducing devices mounted on a vehicle for recording and/or reproducing sound and/or image is a disc player. The disc player is constructed such that a plurality of disc-like recording mediums such as a compact disc (CD) is stored in a magazine, and the whole of the discs stored in the magazine is changed at a time. This brings the disc player to increase the size, so that the main body is received in a trunk, while only a portion necessary for operation is arranged in a cabin. However, changing discs is not possible during driving of the vehicle, and requires stop thereof to open the trunk, forming a bothersome affair.

On this account, vehicle-mounted disc players to be received in cabins are developed in recent years. Such vehicle-mounted disc player, which is required to enable storage of a plurality of discs, is received in a predetermined space in a dashboard in the cabin. Accordingly, there remains an essential challenge of a reduction in size of the vehicle-mounted disc players.

Referring to FIG. 42, for example, the vehicle-mounted disc player includes a roughly rectangular-prism casing 201 of a given dimension called 1 DIN size or the like, in which, for instance, six trays 203 for individually holding six discs 202 thereon are placed one upon another to constitute a disc compartment 204. The six discs 202 are individually loaded through a disc loading opening 205 formed in the casing 201 to be held on the respective trays 203.

The six trays 203 are vertically movably placed one upon another through a guide support 206. Upon reproduction, a selected tray 203 holding a selected disc 202 and all other trays 203 positioned thereabove are moved upward to form a space under the selected tray 203, into which a turntable for holding and turning the disc 202 and an optical pickup are inserted to reproduce the disc 202.

In order to make proof the trays 203 against scratches occurring upon loading of the discs 202, etc., each tray 203 is formed out of a resin molding-in its entirety, or includes a resin layer placed by coating the whole surface of a metal substrate or placed on part of the metal substrate, i.e. a portion thereof contacting the disc 202, in an outsert or adhesive way.

However, the above conventional trays and disc player presented the following problems:

1) The resin-molding tray is of inferior mechanical strength compared with the metal tray. In order to obtain sufficient strength, the thickness should be increased, resulting in increased height of the whole disc player;

2) The tray having a resin layer placed by coating the whole surface of a metal substrate is apt to suffer mixing of foreign matters during full coating, which may cause damage to a disc. Moreover, due to small thickness of the resin layer resulting from coating, the treatment of an end face of the substrate is required to avoid damage to a disc by the end face of the substrate;

3) The tray having a resin layer placed on part of the metal substrate in an outsert way is difficult to obtain small thickness, e.g. 0.1–0.2 mm, of the resin layer due to nature of outsert forming. Moreover, some contrivance should be taken for the substrate to prevent the resin layer from peeling off from the substrate, increasing manufacturing cost; and 4) The tray having a resin layer placed adhesively on part of the metal substrate provides poor workability due to nature of adhesion of the resin layer, and is apt to produce positional displacement during adhesion. Moreover, some adhesive agents may cause peeling of the resin layer, dissolution of the adhesive agent, etc. at a high temperature.

SUMMARY OF THE INVENTION

It is, therefore, an object of the present invention to provide a disc support plate that is free of the above problems and contributes to an improvement in device quality and workability with reduced manufacturing cost. Another object of the present invention is to provide a disc changer mechanism and a disc recording and/or reproducing device including such disc support plate.

The present invention generally provides a disc support plate, comprising:

a substrate; and a resin portion placed on said substrate by printing.

One aspect of the present invention is to provide a device for recording and/or reproducing a disc, comprising:

a casing defining an external shape of the device;

a disc support plate disposed in said casing, said disc support plate comprising a substrate and a resin portion placed on said substrate by printing;

a disc compartment arranged in said casing to receive the disc on said disc support plate;

means for loading and unloading the disc from said disc compartment;

means arranged in said casing for reproducing the disc in said disc compartment; and means for operating at least one of said disc compartment and said reproducing means.

Another aspect of the present invention is to provide a changer mechanism for discs, comprising:

a plurality of disc support plates, each comprising a substrate and a resin portion placed on said substrate by printing;

a disc compartment provided with said plurality of disc support plates, said disc compartment receiving the discs on said plurality of disc support plates;

means for loading and unloading the discs from said disc compartment; and means for selecting one of the discs received in said disc compartment.

BRIEF DESCRIPTION OF THE DRAWINGS

FIG. 28A is a view similar to FIG. 23B, for explaining operation of a separating cam with respect to movement of the tray;

FIG. 28B is a view similar to FIG. 28A, for explaining operation of the separating cam with respect to the pin;

DETAILED DESCRIPTION OF THE INVENTION

Figure 1:
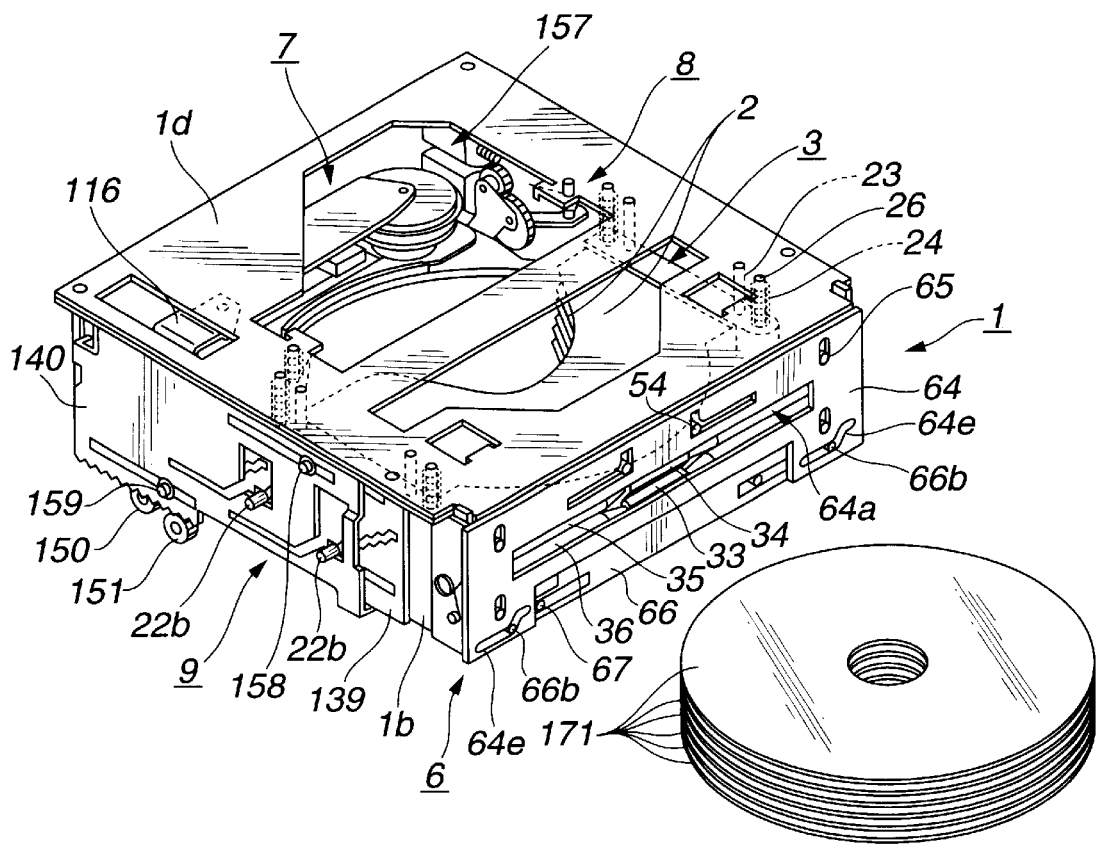
FIG. 1 is a perspective view showing a disc player including a disc changer mechanism and a disc reproducing device embodying the present invention.

Referring to the drawings, a description will be made with regard to a disc support plate embodying the present invention, and also a disc changer mechanism and a disc recording and/or reproducing device including such disc support plate.

In an illustrative embodiment, the present invention is applied to a disc player for reproducing sound. It is noted that in the following description, a disc, including a compact disc (CD), is referred to as CD.

A) General Configuration of the Disc Player

Referring to FIGS. 1–18C, the disc player generally comprises a casing 1 for defining an external shape of the disc player, a disc compartment 3 disposed in the casing 1 in a front portion thereof for storing CDs, transfer means 5 arranged in a loading/unloading opening 4 of a front plate 1a of the casing 1 and for loading and unloading CDs from the disc compartment 3, opening/closing means 6 arranged in a front portion of the transfer means 5 and for opening and closing the loading/unloading opening 4 of the front plate 1a, reproduction means 7 disposed in the casing 1 in a rear portion thereof and for reproducing any one of CDs in the disc compartment 3, push means 8 arranged in the disc compartment 3 on both sides of a rear portion thereof and for pushing CD to be unloaded toward the transfer means 5, and operation means 9 arranged mainly outside right and left side plates 1c, 1b of the casing 1 and for operating disc compartment 3, the reproduction means 7, etc.

The reproduction means 7 comprise space defining means 11 disposed on both sides of a pickup lifting/lowering stage or pickup lifting/lowering means 10 which moves vertically and for defining a space above and below a selected one of CDs in the disc compartment 3, hold means 14 comprising a first or lower arm 13 and a second or upper arm 12 which are rotatably arranged on the pickup lifting/lowering stage 10 and entering in the space for holding the selected CD, disc driving means 15 mounted to the lower arm 13 and for driving the held CD, a pickup unit 16 mounted to the lower arm 13 and for reading information on the rotating CD, torque providing means 17 for transmitting torque to the hold means 14 only in the reproducing mode wherein CD is reproduced and not in the loading/unloading mode wherein CD is loaded and unloaded, and restriction means 18 for setting a timing where the hold means 14 hold CD.

B) Casing

The casing 1 comprises the front plate 1a, the side plates 1b, 1c, a top plate 1d, and a bottom plate 1e. The casing 1 has a rear open. The side plates 1b, 1c and the bottom plate 1e are integrated with each other.

C) Disc Compartment and Tray

Figure 3A:
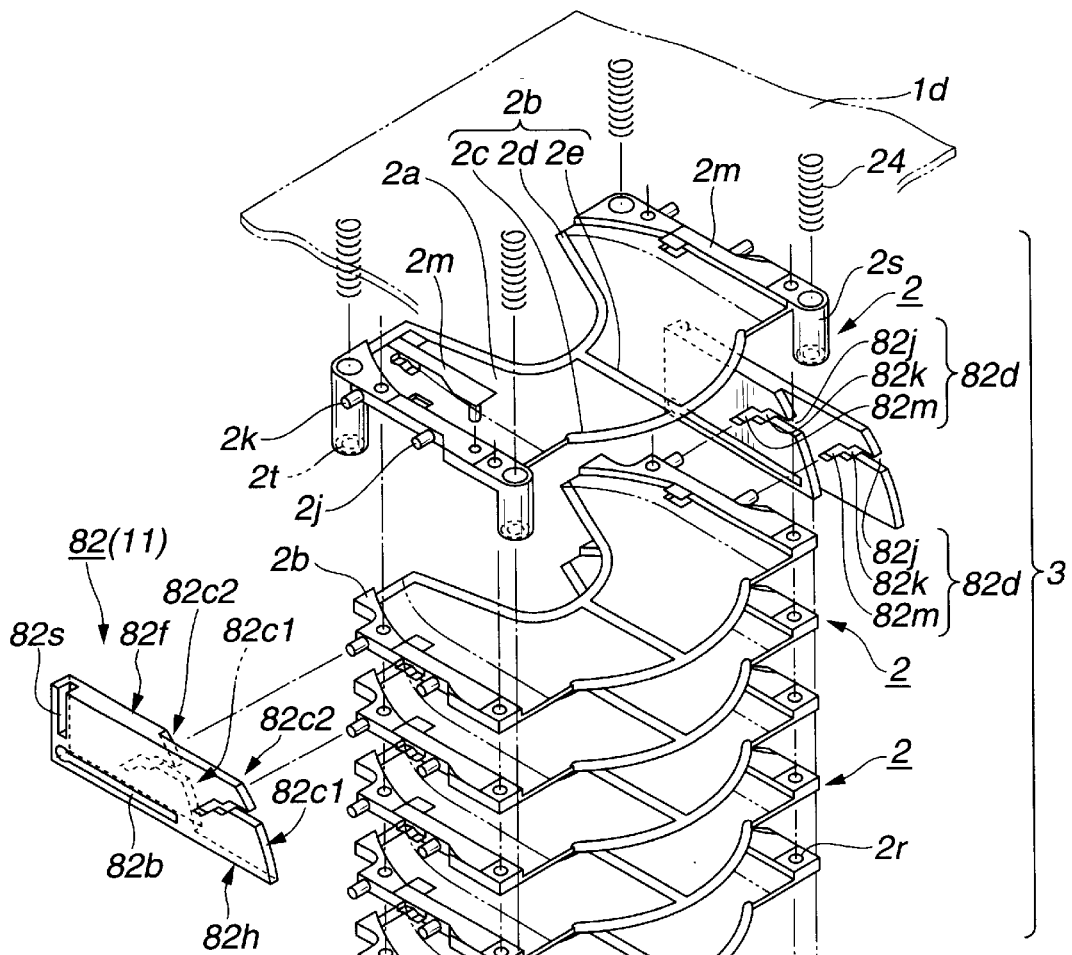
FIG. 3A is a view similar to FIG. 2, showing a disc compartment of the disc player.
Figure 3B:
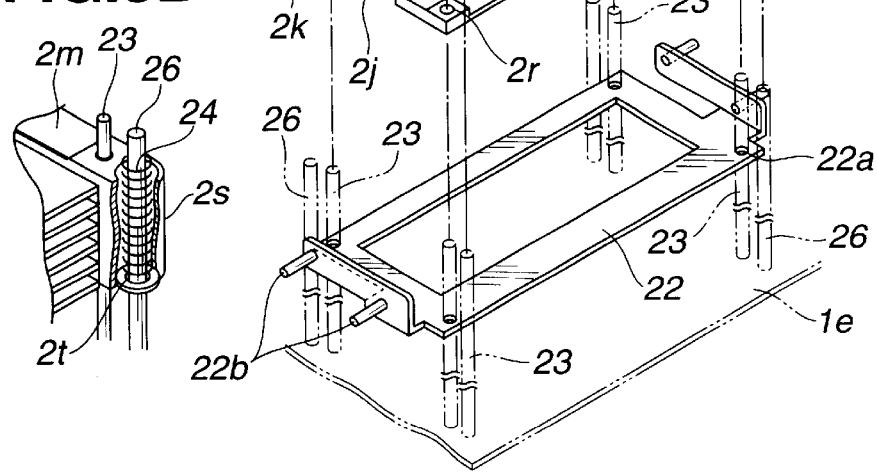
FIG. 3B is a perspective view, partly broken, showing part of a tray of the disc player.

Referring to FIGS. 3A–3B, in the illustrative embodiment, the disc compartment or disc hold means 3 comprises six trays 2 and a disc lifting/lowering stage 22 holding the six trays 2 thereon, and is supported by four guide supports or support means 23 extending vertically and having both ends connected to the bottom plate 1e and the top plate 1d.

Figure 4:
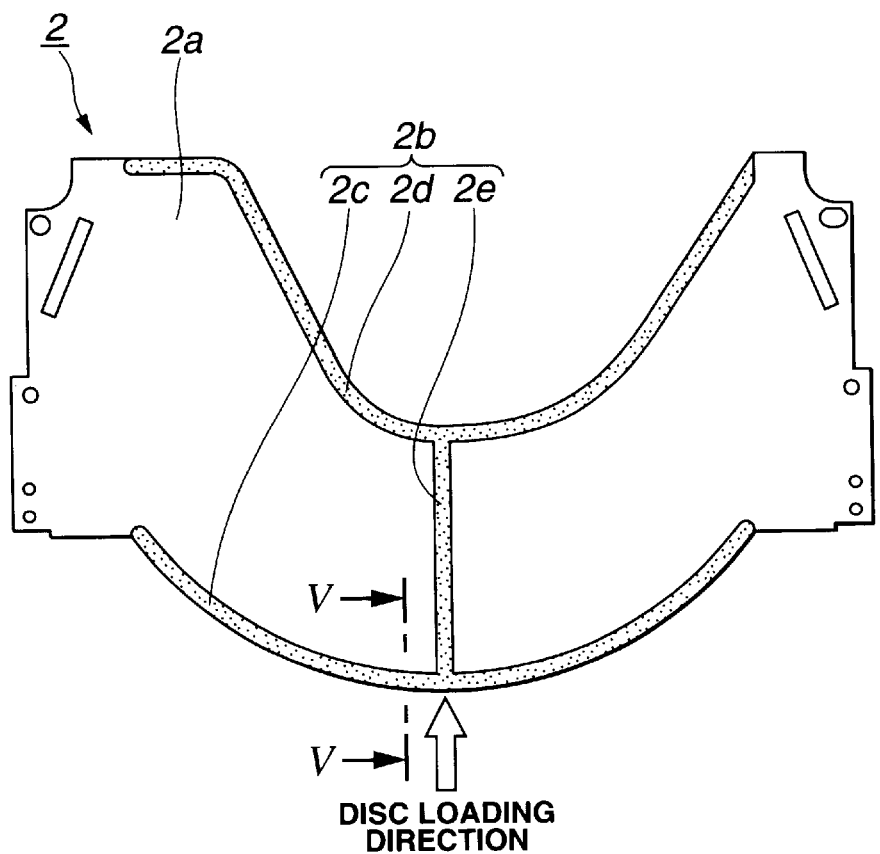
FIG. 4 is a plan view of the tray.

Referring to FIG. 4, each tray 2 is formed by placing a resin portion 2b on a substrate 2a by printing. The resin portion 2b is obtained by carrying out metal-mask printing, silk-screen printing, tampo printing, etc. of ink of epoxy thermoplastic resin and acrylic ultraviolet (UV) cure resin on the substrate 2a.

The resin portion 2b comprises a first resin part 2c placed along an edge on the disc loading side, a second resin part 2d placed along an edge on the disc unloading side, and a third resin part 2e placed in the center between the first and second resin parts 2c, 2d.

Figure 5:
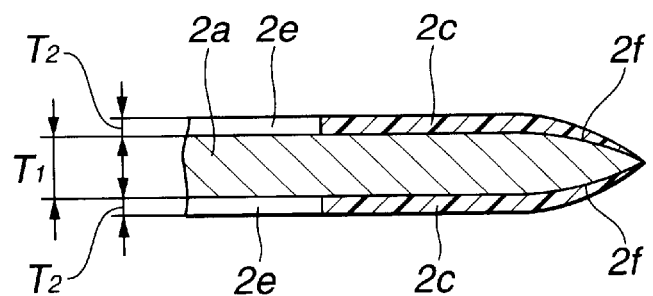
FIG. 5 is a sectional view taken along the line V—V in FIG. 4.

Referring to FIG. 5, the substrate 2a is formed out of metal such as aluminum, stainless steel or the like, and has a thickness T1 of roughly 0.3 mm. Upper and lower surfaces of the edge of the substrate 2a on the disc loading side form inclined faces 2f for guiding CD loading. In place of a metal-material, the substrate 2a may be a thin resin molding with metal powder mixed therein. The resin portion 2b has a thickness of roughly 0.1–0.2 mm.

The first resin part 2c covers the inclined faces 2f of the substrate 2a. The third resin part 2e is arranged in the center of the substrate 2a and parallel with respect to the disc loading/unloading direction, and has longitudinal ends contacting or connecting the first and second resin parts 2c, 2d. The first, second, and third resin parts 2c, 2d, 2e are arranged on both faces of the substrate 2a.

Figure 6:
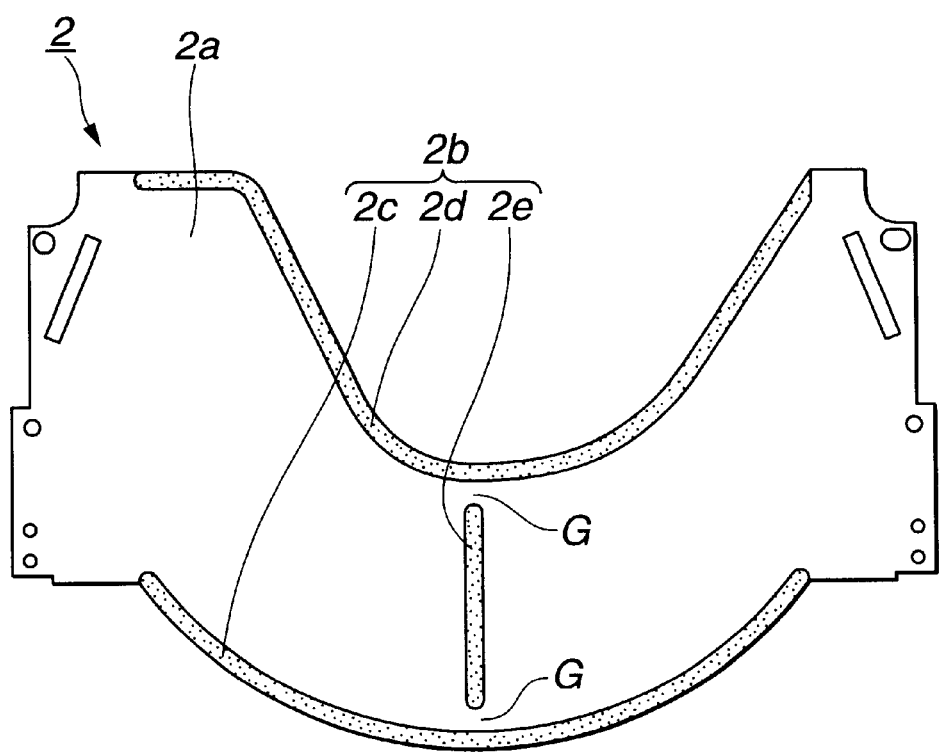
FIG. 6 is a view similar to FIG. 4, showing a first variant of the tray.

FIG. 6 shows a first variant of the tray 2. This variant illustrates a case where the longitudinal ends of the third resin part 2e are arranged in non contact with the first and second resin parts 2c, 2d, i.e. with predetermined clearances G with respect to the first and second resin parts 2c, 2d.

Figure 7:
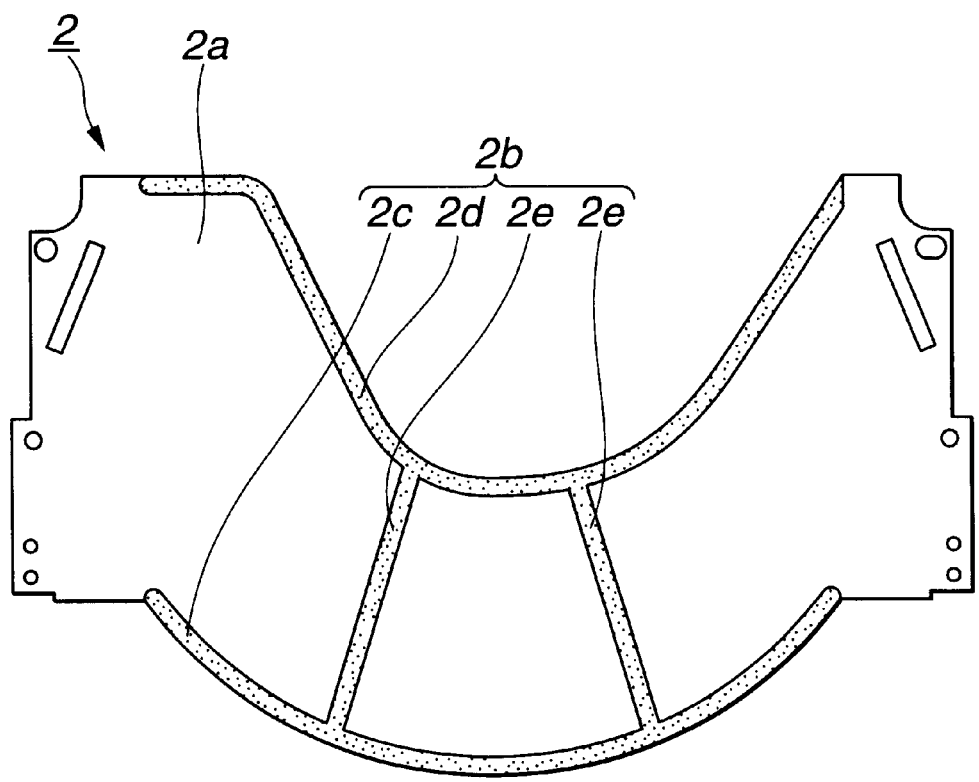
FIG. 7 is a view similar to FIG. 6, showing a second variant of the tray.

FIG. 7 shows a second variant of the tray 2. This variant illustrates a case where the third resin part 2e is arranged symmetrically with respect to the center of the substrate 2a.

Figure 8:
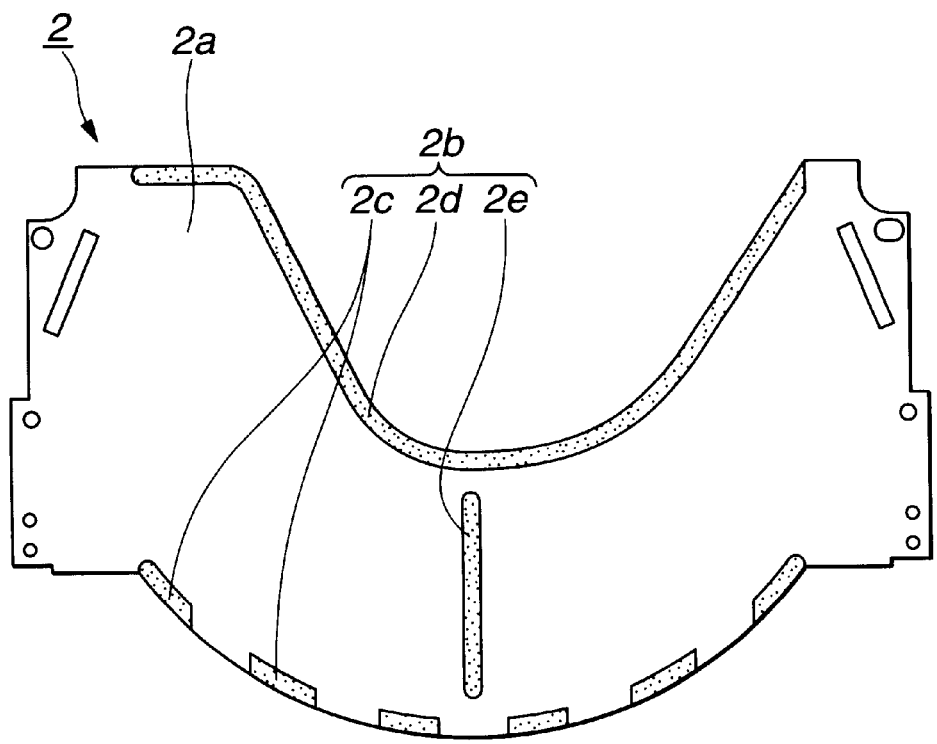
FIG. 8 is a view similar to FIG. 7, showing a third variant of the tray.

FIG. 8 shows a third variant of the tray 2. This variant illustrates a case where one of the first, second, and third resin parts 2c, 2d, 2e (in the illustrated case, the first resin part 2c) is placed discontinuously.

Figure 9:
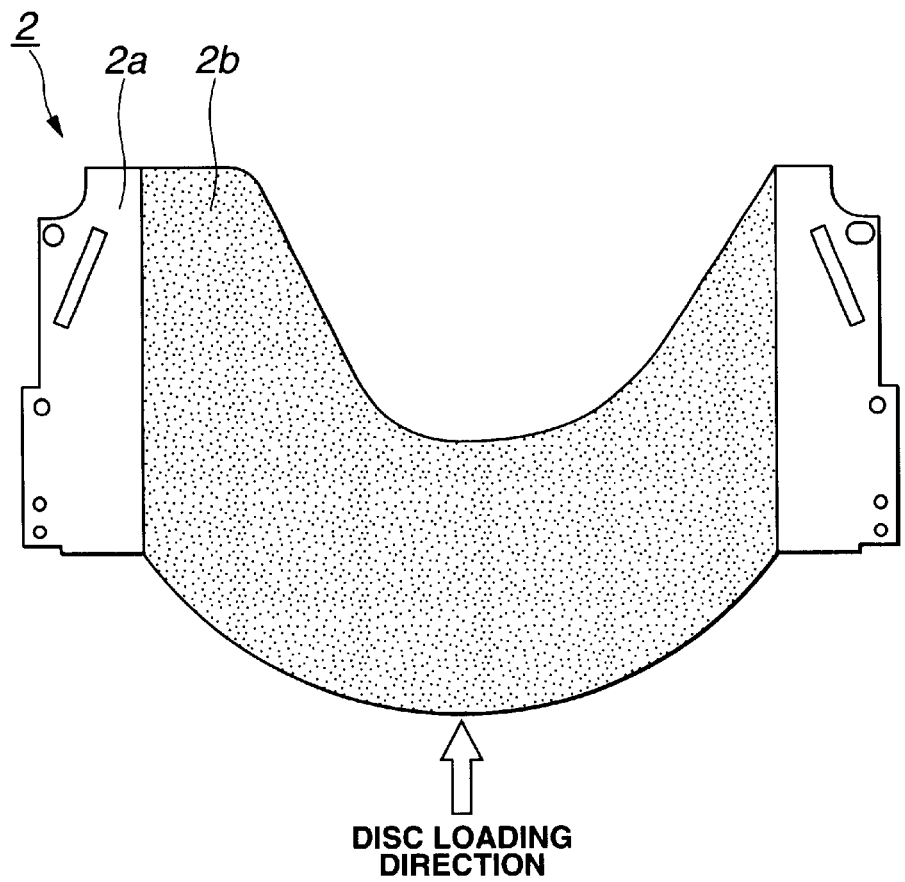
FIG. 9 is a view similar to FIG. 8, showing a fourth variant of the tray.

FIG. 9 shows a fourth variant of the tray 2. This variant illustrates a case where the resin portion 2b is placed on the roughly whole surface of the substrate 2a.

Figure 10:
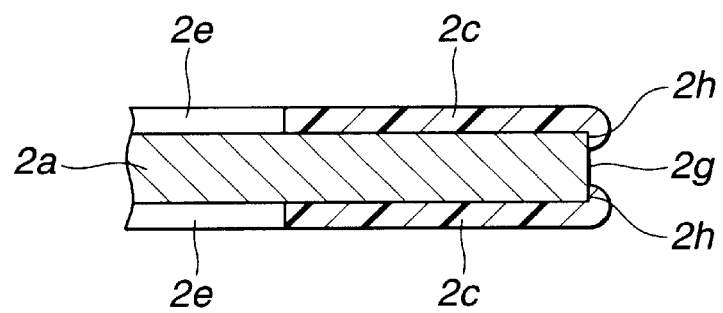
FIG. 10 is a view similar to FIG. 5, showing a fifth variant of the tray.

FIG. 10 shows a fifth variant of the tray 2. This variant illustrates a case where upper and lower edges 2h of an end face 2g are covered with the first and second resin parts 2c, 2d by making the first and second resin parts 2c, 2d come to the end face 2g upon printing.

Figure 11A:
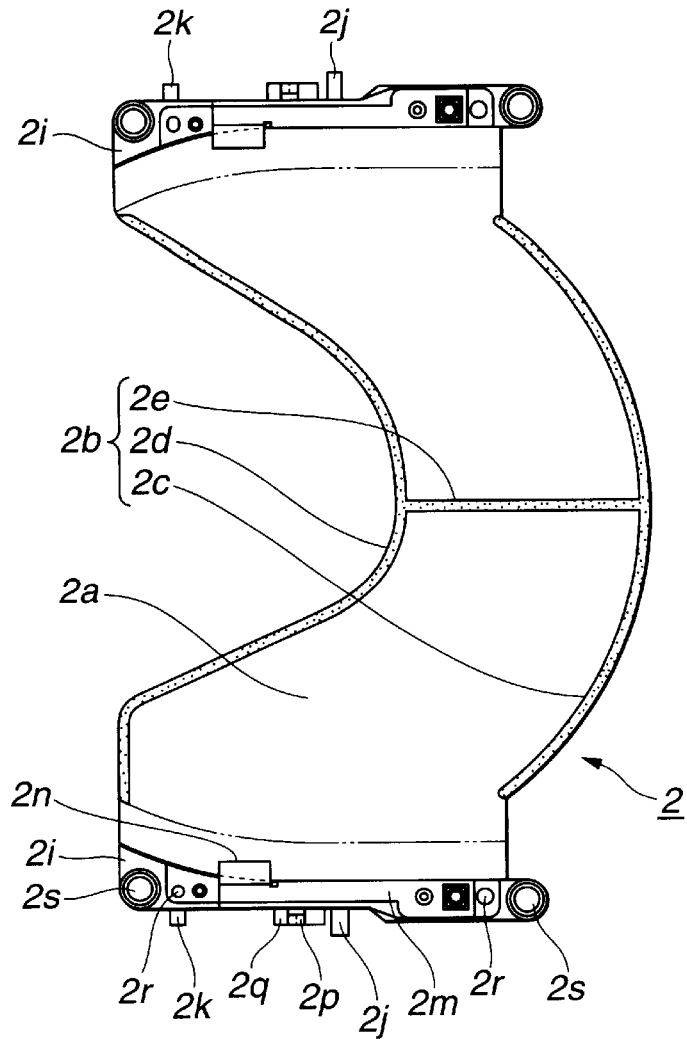
FIG. 11A is a view similar to FIG. 9, showing the disc compartment.
Figure 11B:
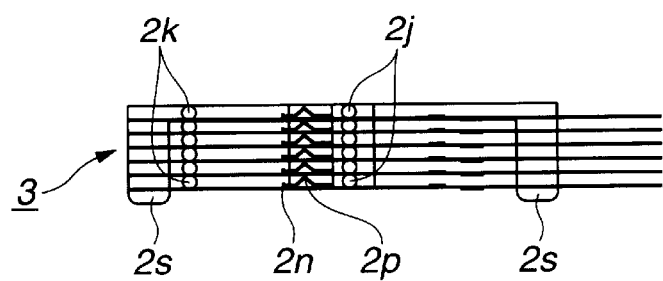
FIG. 11B is a front view showing the disc compartment.

Referring to FIGS. 11A–11B, resin members 2i are placed on both faces and both sides of the tray 2. A pair of pins 2j, 2k is arranged on each resin member 2i in middle and rear portions thereof to protrude laterally The middle pin 2j is longer than the rear pin 2k. The thickness of the resin member 2i is set to be substantially the same as that of CD. A front portion of a pair of plate springs or spring means 2m is secured to the top face of the resin 2i to hold CD between the spring and the substrate 2a. A presser 2n is formed on a rear inside of each plate spring 2m for pressing CD, whereas receivers 2p, 2q are arranged on the rear outside of the plate spring. The receiver 2p is pressed downward by the lower face of a separating cam 82 as described later, and the receiver 2q undergoes an upward force from the lower face of an upper engagement 82j as described later. In front and rear portions of the respective resin members 2i, guide holes 2r are formed through the resin members 2i and the substrate 2a to receive the guide supports 23. Cylindrical spring bearings 2s are integrated with the resin member 2i of the uppermost tray 2 on both sides thereof so as to receive coil springs or biasing means 24, and are arranged between the top plate 1d and the uppermost tray 2. As shown in FIG. 3B, a lower end of each spring bearing 2s slightly protrudes inward to form a receiver 2t that receives a lower end of a coil spring 24. The receiver 2t is arranged to prevent a load required for compression from excessively being greater even if the compression length is larger with use of a long spring.

The disc lifting/lowering stage 22 has both ends bent upward. Guide holes 22a are formed in a horizontal part of the stage to receive the guide supports 23, and a pair of pins 22b is secured to each outer face of a vertical part of the stage to protrude horizontally. The pins 22b protrude outside the casing through two vertical slits 25 formed in the side plates 1c, 1b of the casing 1.

The disc lifting/lowering stage 22 and the six trays 2 are vertically movably supported by arranging the guide supports 23 through the guide holes 22a, 2r. Four spring guides 26 have respective upper and lower ends secured to the top plate 1d and the bottom plate 1e of the casing 1, and are arranged through the respective spring receivers 2s. A lower end of each coil spring or biasing means 24 arranged to enclose the spring guide 26 abuts on the receiver at the lower end of the spring receiver 2s.

D) Transfer Means

Figure 2:
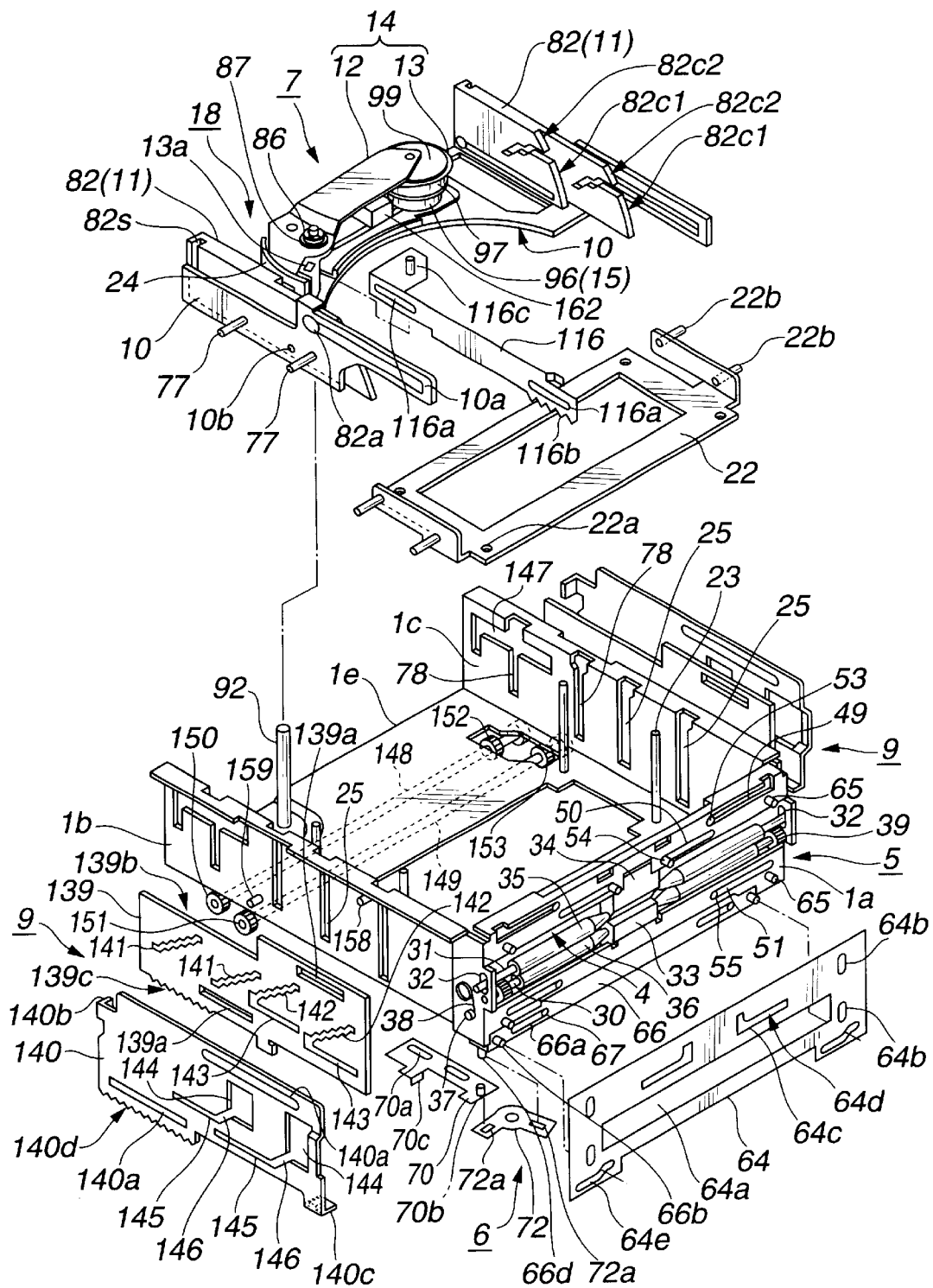
FIG. 2 is an exploded perspective view showing the disc player.
Figure 12:
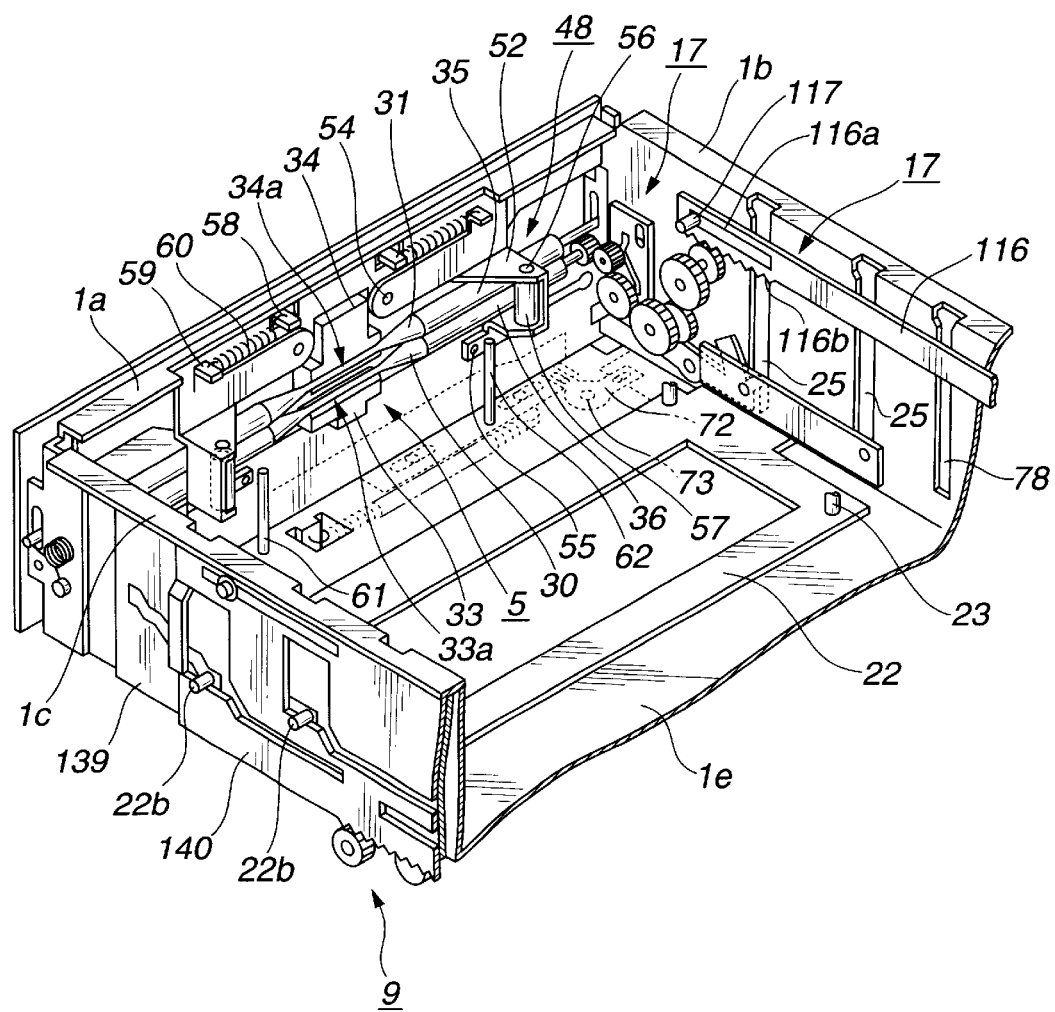
FIG. 12 is a view similar to FIG. 1, showing the inside of a casing as viewed from the rear.

Referring to FIG. 2, the transfer means 5 are arranged with the front plate 1a of the casing 1. The loading/unloading opening 4 is formed in the front plate 1a. A drive shaft 30 and a driven shaft 31 are rotatably supported in the loading/unloading opening 4. Both ends of the drive shaft 30 are rotatably mounted to the front plate 1a, whereas both ends of the driven shaft 31 are arranged through a vertically extending slot 32 formed in a side face of the front plate 1a. Referring to FIG. 12, in order to support the middle of the drive shaft 30 and the driven shaft 31, a small-diameter portion of the middle of the drive shaft 30 is rotatably engaged with a groove 33a formed in the rear face of a resin bearing 33 having restricted downward movement. A small-diameter portion of the middle of the driven shaft 31 is rotatably engaged with a groove 34a formed in the rear face of the vertically movable resin bearing 34 through a pair of guide protrusions and a pair of guide grooves, not shown. A pair of rubber rollers 35 is mounted to the driven shaft 31, and a pair of rubber rollers 36 is mounted to the drive shaft 30, wherein axial slide of each roller is restricted by a retaining ring, not shown. Circular grooves are formed at both ends of the drive shaft 31. A spring 38 for biasing the driven shaft 31 toward the drive shaft 30 has both ends engaged with a spring pin 37 secured to the side face of the front plate 1a and the circular groove.

Figure 13:
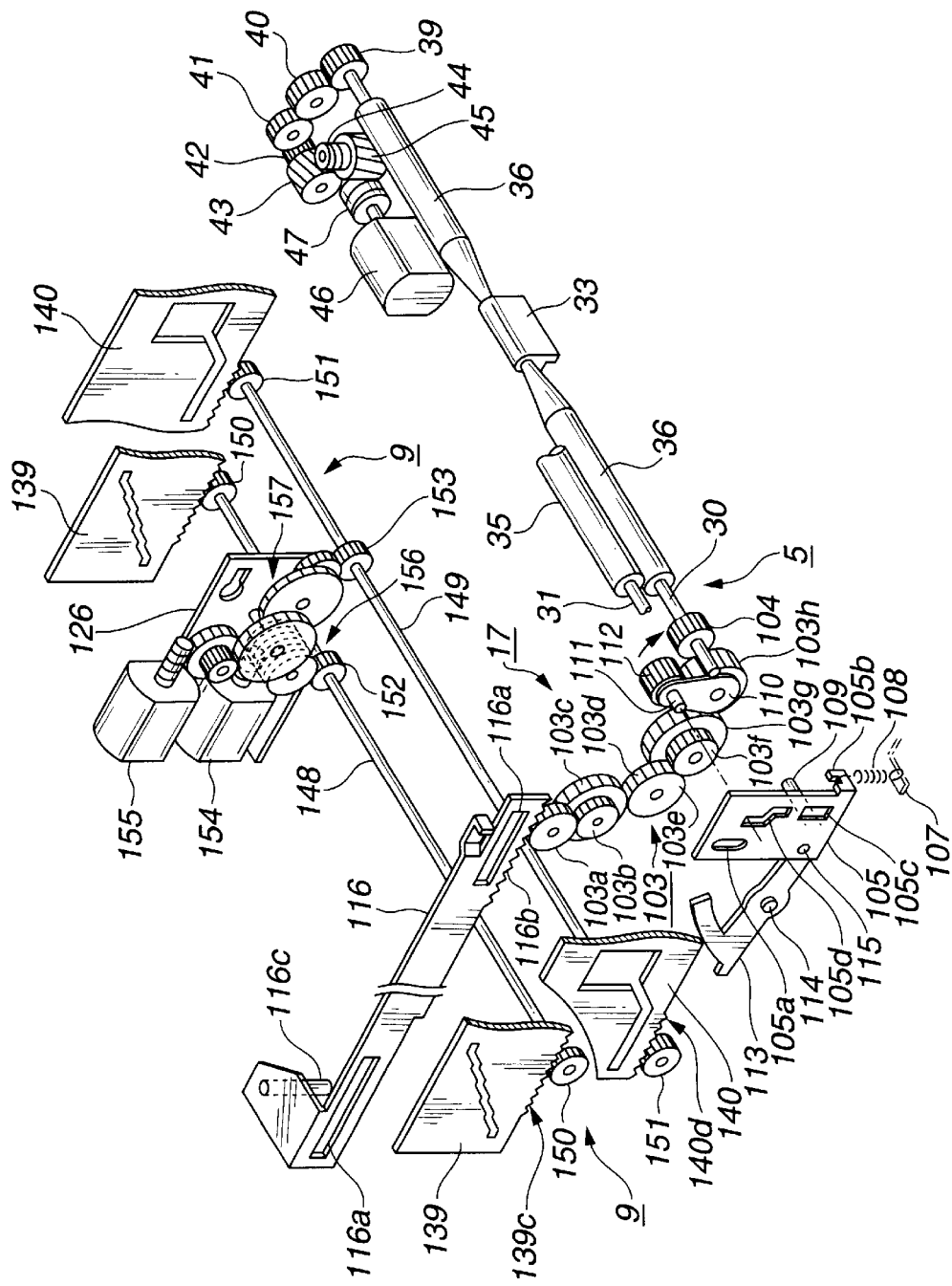
FIG. 13 is a view similar to FIG. 3A, showing transfer means, torque providing means, etc.

Means for driving the drive shaft 30 will be described. Referring to FIG. 13, a gear 39 is secured to a right end of the drive shaft 30, and gears 40, 41 and gears 42, 43 integrated with each other are rotatably supported by the inside of the right side face 1c. A worm 44 meshed with the gear 43 and a gear 45 are integrally rotatably supported on the bottom plate 1e, and a worm 47 is meshed with the gear 45 and secured to an output shaft of a transfer motor 46 mounted to the bottom plate 1e.

Referring to FIGS. 2 and 12, press means 48 are arranged to automatically ensure operation of further pressing CD by a few millimeters after completion of CD loading by the rollers 35, 36. Three pairs of horizontally extending guide slots 49, 50, 51 are formed in the front plate 1a above and below the loading/unloading opening 4. A pair of slide mounts 52 is arranged on both sides and at the rear of the front pate 1a, and three pairs of guide pins 53, 54, 55 are secured to the slide mounts 52 and irremovably arranged through the guide slots 49, 50, 51. A resin vertical roller 57 is rotatably supported to the corresponding slide mount 52 in a rear portion thereof through a vertical shaft 56. In order to bias the slide mounts 52 in the direction of approaching each other, a push spring 60 is arranged between a spring engagement 58 formed with the front face 1a and a spring engagement 59 formed with the slide mount 52.

CD at the level corresponding to that of the vertical roller 57 is positioned horizontally by the vertical roller 57, whereas CDs above and below the vertical roller 57 are positioned by a pair of positioning rods 61, 62 vertically mounted to the bottom plate 1e as shown in FIG. 12 and a pair of positioning rods, not shown, vertically mounted to the top plate 1d. The unillustrated positioning rods are disposed on an elongation of the positioning rods 61, 62. A space is defined between the positioning rods 61, 62 and the unillustrated positioning rods to allow passage of CD to be loaded and unloaded.

E) Opening/closing Means

The opening/closing means 6 for opening and closing the loading/unloading opening 4 of the front face 1a will be described. A shutter 64 is vertically movably mounted to the front plate 1a on a front face thereof as shown in FIG. 2. An opening 64a is formed in the shutter 64 to allow passage of CD, wherein when the shutter 64 is raised, the middle level of the opening 64a corresponds to a boundary between the rollers 35, 36 to have the opening 64a open, and when the shutter 64 is lowered, the opening is closed.

Specifically, a pair of upper and lower guide pins 65 is mounted to the front plate 1a on both sides thereof, and a pair of vertically extending guide slots 64b is formed in the shutter 64. A retaining ring is engaged with a head of each guide pin 65 arranged through the guide slots 64b. In order to have a distance between the slide mounts 52 larger only when the shutter 64 is raised to open, the guide pins 54 in the vicinity of the center are set to be longer than the other guide pins 53, 55, and a pair of L-shaped guide holes 64c is formed in the shutter 64 to receive the respective guide pins 54. A guide rail 64d is formed with the upper face of each guide hole 64c so that the shutter 64 is forcibly raised to open when CD is unloaded by constraint in enlarging the distance between the vertical rollers 57 for some reason.

A link mechanism for opening and closing the shutter 64 will be described. Laterally extending guide slots 66a are formed in front and lower faces of a laterally slide plate 66 with roughly L-shaped section, and guide pins 67 are arranged through the guide slots 66a and secured to the front plate 1a and the bottom plate 1e. Cam holes 64e are formed in the shutter 64 on both sides and in a lower portion thereof, whereas slide pins 66b are secured to the laterally slide plate 66 on both sides and on a front face thereof, and are arranged through the respective cam holes 64e. Referring to FIG. 24B, spring engagements 66c, 68 are formed with the lower faces of the laterally slide plate 66 and the bottom plate 1e to protrude downward, and a return spring 69 is provided between the two. A longitudinally slide plate 70 is longitudinally slidably mounted to the left lower face of the bottom plate 1e. Specifically, a pair of guide slots 70a is formed in the longitudinally slide plate 70, and a pair of headed pins, not shown, is arranged through the guide slots 70a and secured to the bottom plate 1e. A roughly L-shaped lever 72 has a bent rotatably mounted to the lower face of the bottom plate 1e through a stationary shaft 73 as shown in FIG. 12, and ends formed with respective slots 72a. Pins 66d, 70b are secured to the laterally slide plate 66 and the longitudinally slide plate 70 and loosely engaged with slots 72a, respectively. A pressed portion 70c, pressed by an outer slider 140 as described later, is formed with the longitudinally slide plate 70.

F) Reproduction Means

The reproduction means 7 is disposed close to the rear of the disc compartment 3 to minimize the depth of the disc player. Since the hold means 14 in the reproduction means 7 are mounted to the pickup lifting/lowering stage 10, a description will be made first with regard to the pickup lifting/lowering stage 10.

The pickup lifting/lowering stage 10 comprises a horizontal plate and vertical plates disposed on both sides and integrated with the horizontal plate. A circular recess 10a is formed in the horizontal plate in a front portion thereof to allow CD insertion. A pair of horizontally protruding pins 77 is secured to each vertical plate to move vertically the pickup lifting/lowering stage 10. The pins 77 are positioned at the same level, and are shorter than the pins 22b of the disc lifting/lowering stage 22. The pair of pins 77 is arranged through a pair of vertical slots 78 formed in the side plates 1c, 1b of the casing 1 to protrude outward.

Space Defining Means or Control Means

As shown in FIG. 2, the separating cams 82 made of resin are longitudinally slidably arranged inside the vertical plates of the pickup lifting/lowering stage 10, which serve as space defining means or control means 11 inserted between the two vertically adjacent trays 2 for defining a space above and below the selected CD. Specifically, a guide slot 10a is formed in the vertical plate of the pickup lifting/lowering stage 10 in an upper front portion thereof, and a headed guide pin 82a is arranged through the guide slot 10a and secured to each separating cam 82. As shown in FIG. 3A, a guide slot 82b is formed in the separating cam 82 in the lower portion thereof, and a headed guide pin 10b (see FIG. 2) is arranged through the guide slot 82b and secured to the vertical plate in a longitudinally middle portion thereof.

The separating cams 82 are inserted between the trays 2 to lift the four pins 2j, 2k arranged both side of the tray 2, thereby stably supporting the tray 2 and defining a space above and below the tray 2 holding thereon CD to be reproduced. The separating cams 82, each obtained by placing two plates of different longitudinal lengths formed with a sift, slip into both sides of the tray 2 to move upward the long pins 2j of the tray 2 through the front portion and the short pins 2k through the rear portion.

Specifically, the separating cams 82 are configured as follows. A pair of first separating control parts $82c_1$ is formed to move upward the tray 2 for holding the selected CD and the trays 2 thereabove, whereas a pair of second separating control parts $82c_2$ is formed above the first separating control parts 82c, to move upward only the trays 2 above the selected tray 2. Third separating control parts 82d are arranged between the first separating control parts $82c_1$, and the second separating control parts $82c_2$, respectively, for holding only the selected tray 2. Formed with the separating cam 82 along the moving direction thereof are a top face 82f for holding the position of the pins 2j, 2k of the trays 2 above the selected tray 2, and a lower face or position control means 82h for holding the position of the pins 2j, 2k of the trays 2 below the selected tray 2 and retaining the receiver 2p of the plate spring 2m.

The pins 2j, 2k of the selected tray 2 and the trays 2 thereabove are lifted up by forward movement of the first and second separating control parts $82c_1$, $82c_2$, so that an angle θ of lift of the separating cam 82 is fundamentally set to a predetermined value, e.g. 45°. Here, however, the trays 2 are lifted in compressing the coil springs 24, so that as the position of the tray 2 is higher, the amount of compression of the coil springs 24 is greater to increase a load acting upon lifting of the tray 2. That is, a load is smaller at an initial stage of compression of the coil springs 24. As a result, referring to FIG. 28A, an angle $θ_1$ of lift of an upper portion of the first and second separating control parts $82c_1$, $82c_2$ is set, e.g. to 45°, and an angle $θ_2$ of lift in a lower portion is set, e.g. to 60°, with the middle portion of the two including a circular face.

Next, the third separating control parts 82d will be described. Each third separating control part 82d comprises the upper engagement 82j, a middle engagement 82k, and a lower engagement 82m. The upper engagement 82j serves to define a space above and below the selected tray 2, the middle engagement 82k serves to lower the selected tray 2 and CD to place the selected CD on a turntable 97 of the lower arm 13, and the lower engagement 82m serves to lower only the selected tray 2 again to separate it from the selected CD.

Hold Means

Figure 14:
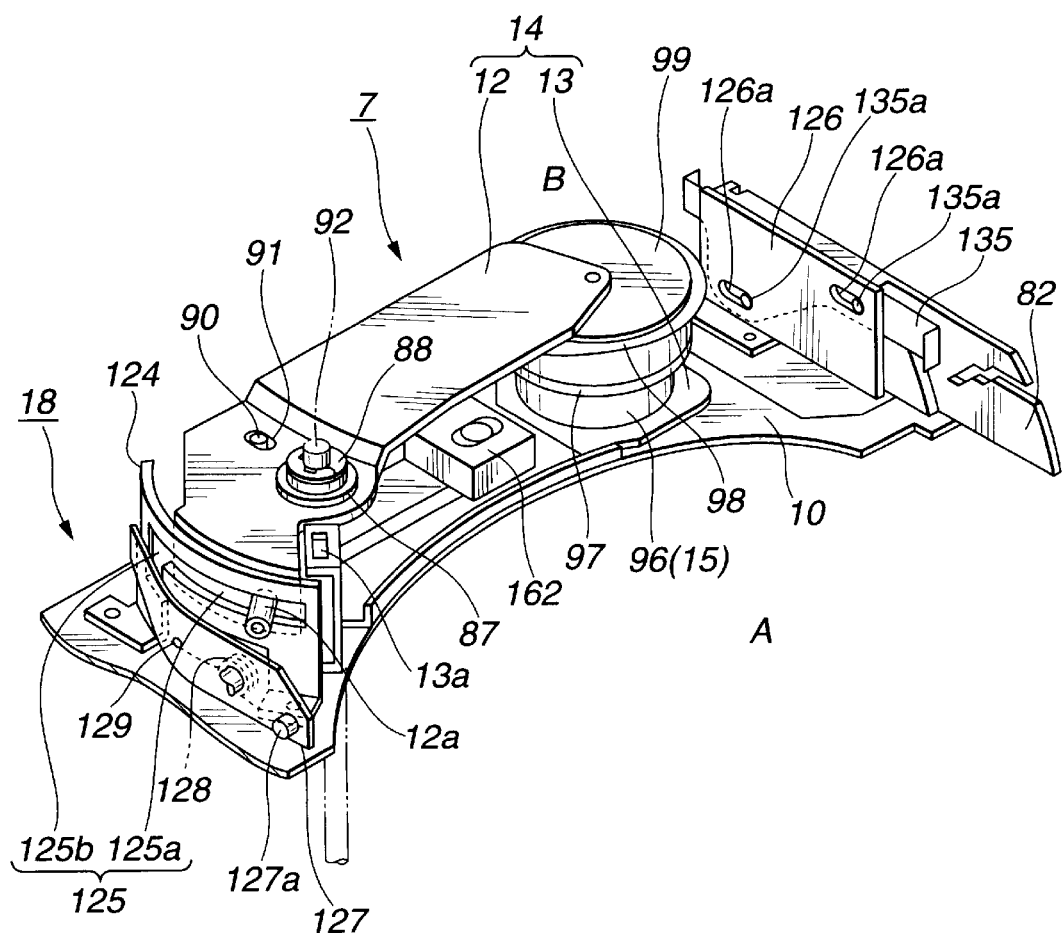
FIG. 14 is a view similar to FIG. 12, showing reproduction means.
Figure 15:
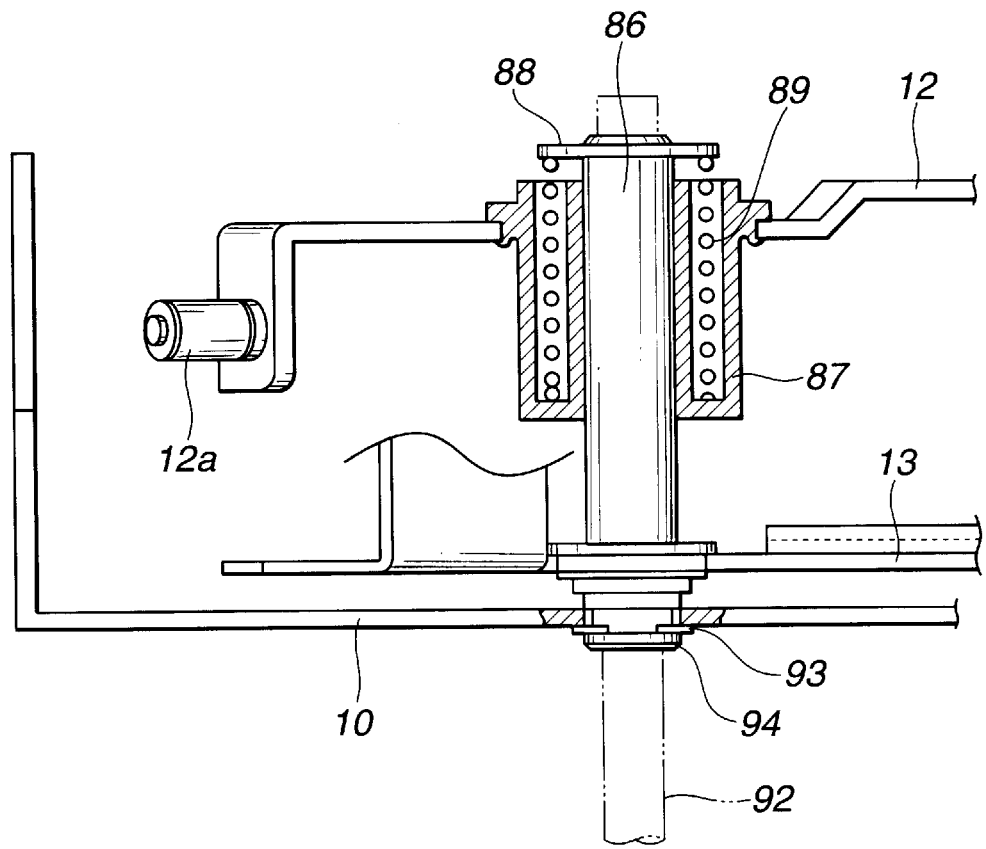
FIG. 15 is a view similar to FIG. 10, showing part of hold means.

The hold means 14 are rotated toward the space defined above and below the selected CD by the space defining means 11 to hold the selected CD. Base ends of the lower and upper arms 13, 12 are rotatably mounted to the pickup lifting/lowering stage 10 on the left thereof. Specifically, referring to FIG. 15, a hollow shaft 86 has a near lower end secured to the lower arm 13, and a lower end rotatably arranged through the pickup lifting/lowering stage 10, with which a flat washer 93 and a retaining ring 94 are engaged for anti-disengagement. A sleeve 87 of a copper alloy is fixedly engaged with the base end of the upper arm 12, through which the hollow shaft 86 is arranged so that the upper arm 12 is lowered parallel to the lower arm 13 to hold the selected CD. A flat washer 88 and a retaining ring are engaged with an upper end of the hollow shaft 86. A hold spring 89 is arranged between the flat washer 88 and the sleeve 87 to bias the upper arm 12 downward. Referring to FIG. 14, in order to obtain synchronous unitary rotation of the lower and upper arms 13, 12 about the hollow shaft 86 without any relative rotation, a slide pin 90 is provided on the lower arm 13 and slidably arranged through a hole 91 formed in the upper arm 12. Moreover, in order to improve the positioning accuracy of the turntable or disc rotating means 97 as describe later on the lower arm 13 with respect to CD upon rotation of the hold means 14, a support 92 is provided on the bottom plate 1e and arranged through the hollow shaft 86 on the pickup lifting/lowering stage 10.

Disc Driving Means

Figure 41:
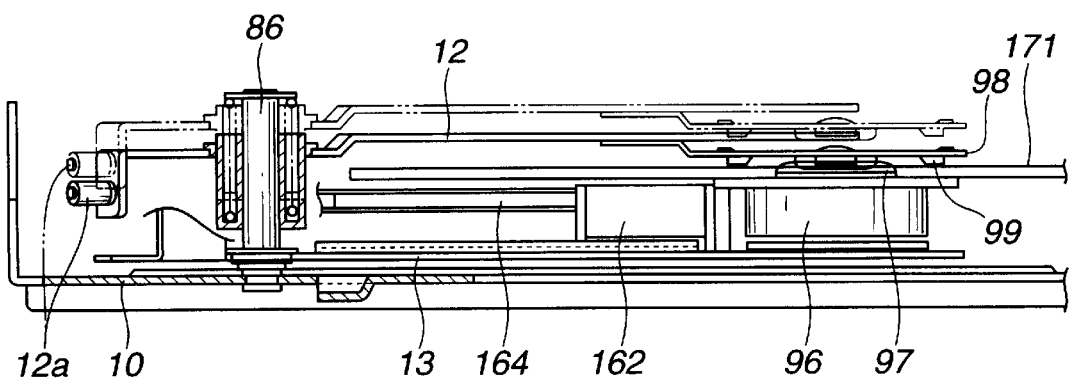
FIG. 41 is a view similar to FIG. 40B, showing the hold means that hold the disc due to blocking released by the restriction means.
Figure 42:
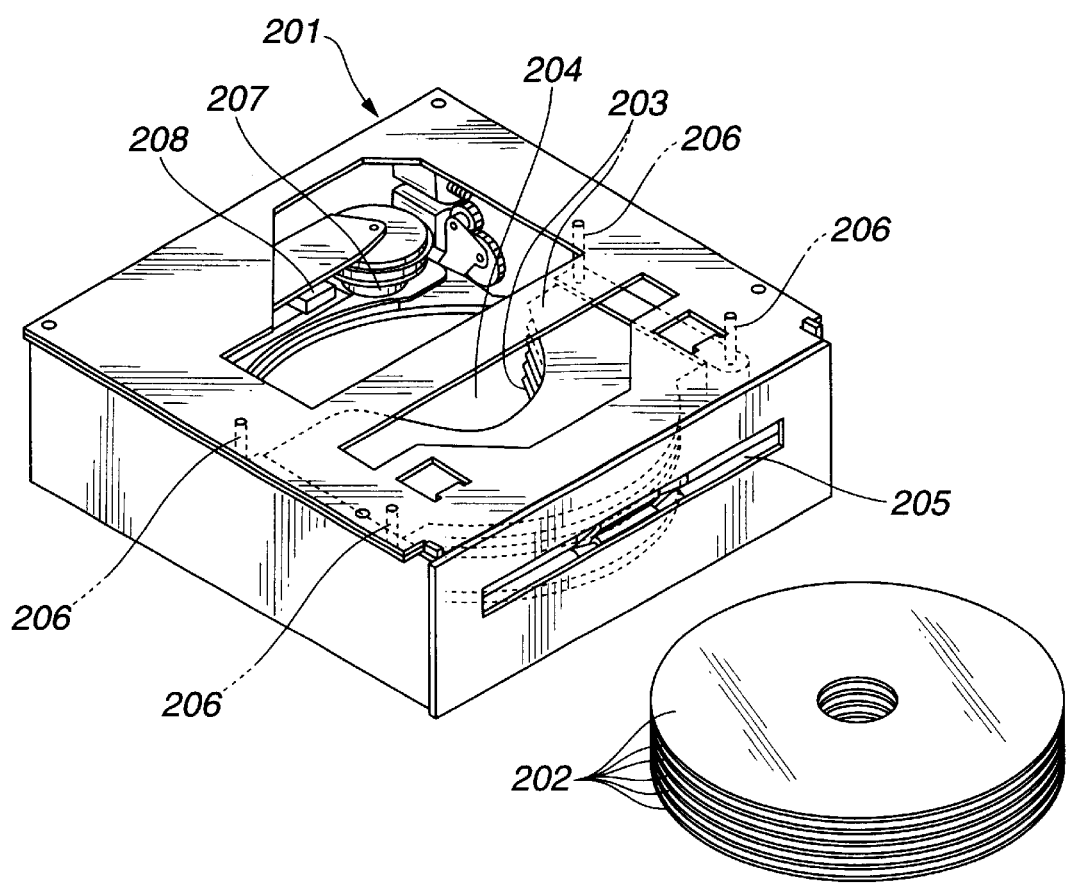
FIG. 42 is a view similar to FIG. 14, showing a conventional disc player.

The disc driving means 15 are arranged on the top face of a head of the lower arm 13. Specifically, referring to FIG. 14, the disc driving means 15 comprise a spindle motor 96 having an output shaft, to which the turntable 97 is mounted to engage with a center hole of CD. Referring to FIG. 41, a support plate 98 has one end secured to a head of the upper arm 12 in the vicinity thereof, and another end formed with a circular hole. A chuck plate or disc hold means 99 made of a resin and having a rib-like protrusion formed circularly on the lower face of a disc is rotatably engaged with the hole from above. Anti-disengagement of the chuck plate 99 is ensured by one end of a spring plate, not shown, having another end secured to the lower face of the upper arm 12.

Pickup Unit

Figure 16:
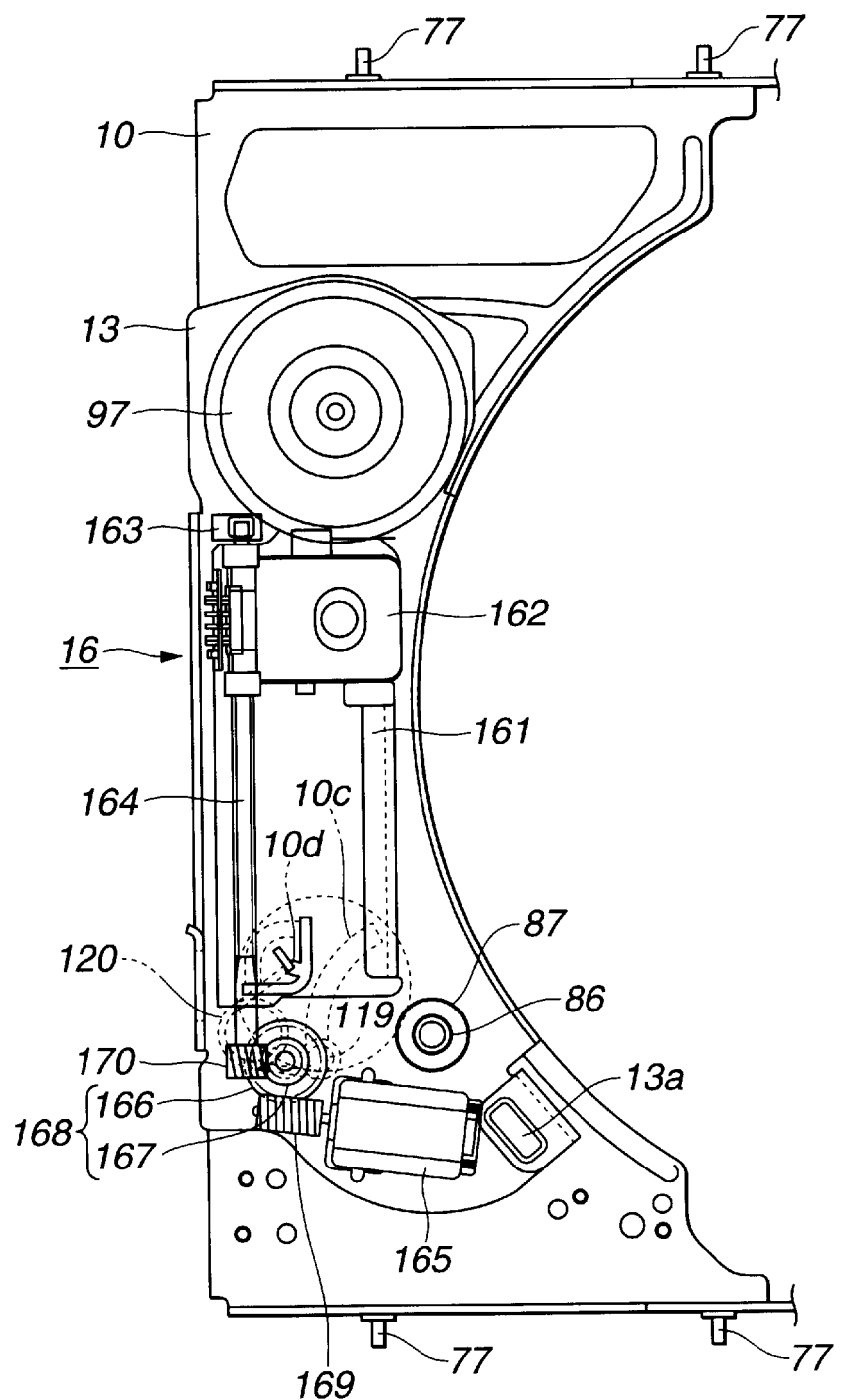
FIG. 16 is a view similar to FIG. 11A, showing a pickup unit.

Referring to FIG. 16, the pickup unit 16 is also mounted on the top face of the lower arm 13. The configuration of the pickup unit 16 will be described. An optical pickup 162 is arranged to be movable along the longitudinal direction of the lower arm 13 through a guide rail 161 integrated with the lower arm 13. Also arranged are means for reciprocating the optical pickup 162 along the guide rail 161. A threaded shaft 164 is rotatably supported on the top face of the lower arm 13 through a pair of bearing members 163, with which a female thread portion, not shown, of the optical pickup 162 is meshed. An output shaft of a scanning motor 165 arranged in the vicinity of the sleeve 87 is coupled with the threaded shaft 164. Specifically, a gear 168 having a worm wheel 166 and a crossed helical gear 167 integrated with each other is supported rotatably, wherein the worm wheel 166 is meshed with a worm of the output shaft of the motor 165, and the crossed helical gear 167 is meshed with a crossed helical gear 170 mounted to the threaded shaft 164.

Torque Providing Means

The torque providing means 17 rotate the hold means 14 by torque from the transfer motor 46. Referring to FIG. 13, a gear train 103 is arranged inside the left side plate 1b of the casing 1. Specifically, the gear train 103 comprises gears 103a–103h. A gear 104 is also secured to a left end of the drive shaft 30. A plate 105 is vertically movably arranged inside the left side plate 1*b*. Specifically, a vertically extending guide slot 105*a* is formed in an upper portion of the plate 105, through which a guide pin 106 (see FIGS. 35A–35B) is arranged. The guide pin 106 is secured to the left side plate 1*b*, and has a retaining ring mounted thereto. Spring engagements 105*b*, 107 are formed with a lower portion of the plate 105 and the bottom plate 1*e* of the casing 1*e*, and a return spring 108 is arranged between the two for biasing the plate 105 downward. An escape hole 105*c* is formed in the plate 105 to receive a shaft 109 of the gear 103*h*. The shaft 109 is secured to the side plate 1*b*, to which a base end of a lever 110 is mounted rotatably. A shift shaft 111 is arranged through the lever 110 and secured to a head of the shaft 109. A gear 112 is rotatably mounted to the shift shaft 111 and meshed with the gear 103*h*. A cam hole 105*d* is formed in the plate 105 above the escape hole 105*c*, through which an end of the shift shaft 111 is arranged. Specifically, when moving the plate 105 upward, the cam hole 105*d* is moved upward, and the shift shaft 111 arranged through the cam hole 105*d* is moved forward, thereby also obtaining mesh of the gear 112 mounted to the shift shaft 111 with the gear 104 of the drive shaft 30. In order to move the plate 105 upward, a middle portion of the lever 113 is rotatably supported by the inside of the left side plate 1*b* through a pin 114, and one end of the lever 113 is rotatably connected to a lower portion of the plate 105 through a pin 115. Another end of the lever 113 faces a lower portion of the front one of the guide slits 25 of the left side plate 1*b* through which the pin 22*b* of the disc lifting/lowering stage 22 is arranged. That is, when the disc lifting/lowering stage 22 is in the lowermost position to enter the reproducing mode, the pin 22*b* pushes another end of the lever 113 downward to mesh the gear 112 with the gear 104.

The uppermost gear 103*a* of the gear train 103 is coupled with the lower arm 13 of the hold means 14 as follows. As shown in FIG. 2, a slide bar 116 is arranged which comprises a longitudinally lengthened vertical part and a horizontal part integrated with the vertical part in a rear portion thereof. A pair of guide slots 116*a* is formed in the slide bar 116 in the vicinity of both sides of the vertical part, and, referring to FIG. 12, a pair of guide pins 117 is arranged through the pair of guide slots 116*a* and secured to the inside of the left side plate 1*b*, each having a retaining ring mounted thereto. A rack 116*b* is formed with a lower front portion of the longitudinally slidably slide bar 116 to mesh with the gear 103*a*. An engagement pin 116*c* protruding downward has an upper end secured to a head of the horizontal part. As shown in FIG. 14, the engagement pin 116*c* is integrated with a base end of the lower arm 13, and is loosely engaged with a slot 13*a* formed in the horizontal part and extending to the level of the upper arm 12. Referring to FIG. 16, the slot 13*a* is formed to extend along a radial straight line passing through the axis of the sleeve 87 and orthogonal to the sleeve 87.

Figure 17A:
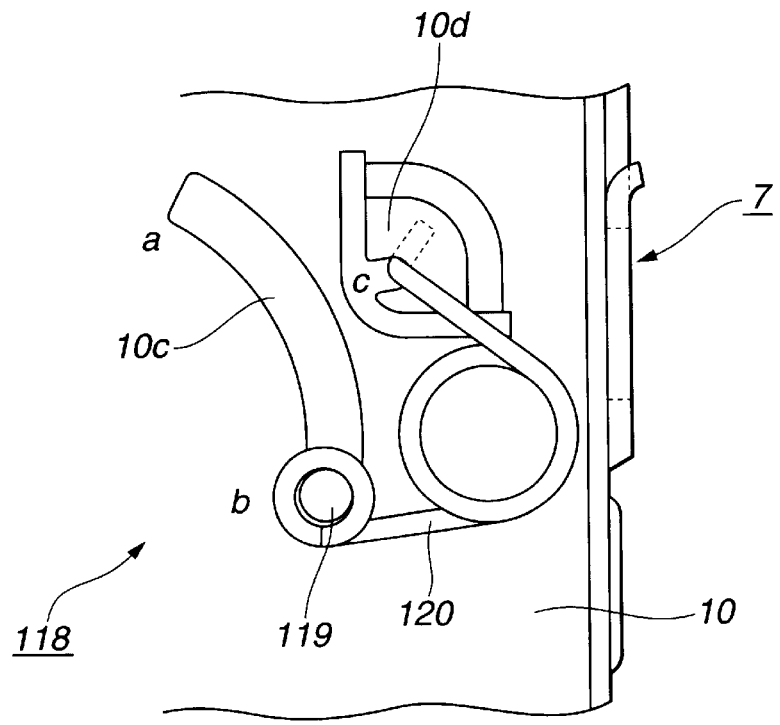
FIG. 17A is a rear view showing positioning means, wherein the hold means are positioned in the standby position.
Figure 17B:
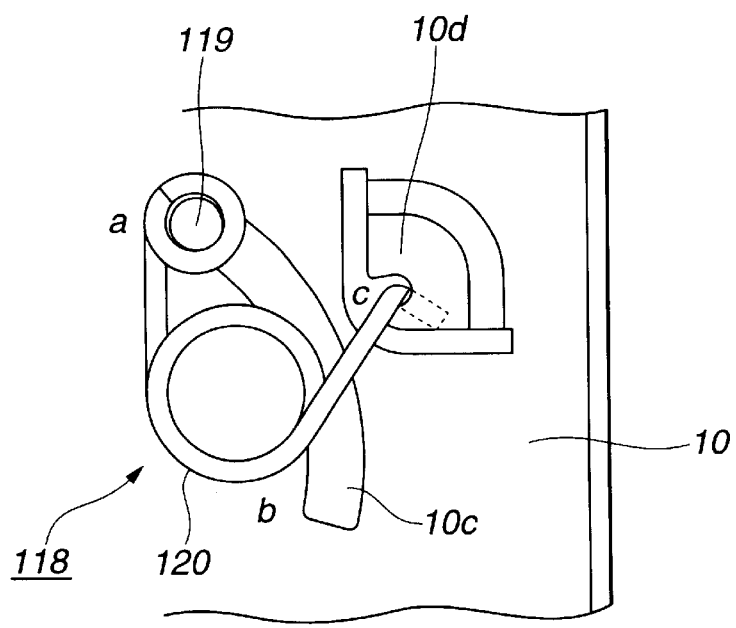
FIG. 17B is a view similar to FIG. 17A, showing the positioning means, wherein the hold means are positioned in the reproduction position.
Figure 37:
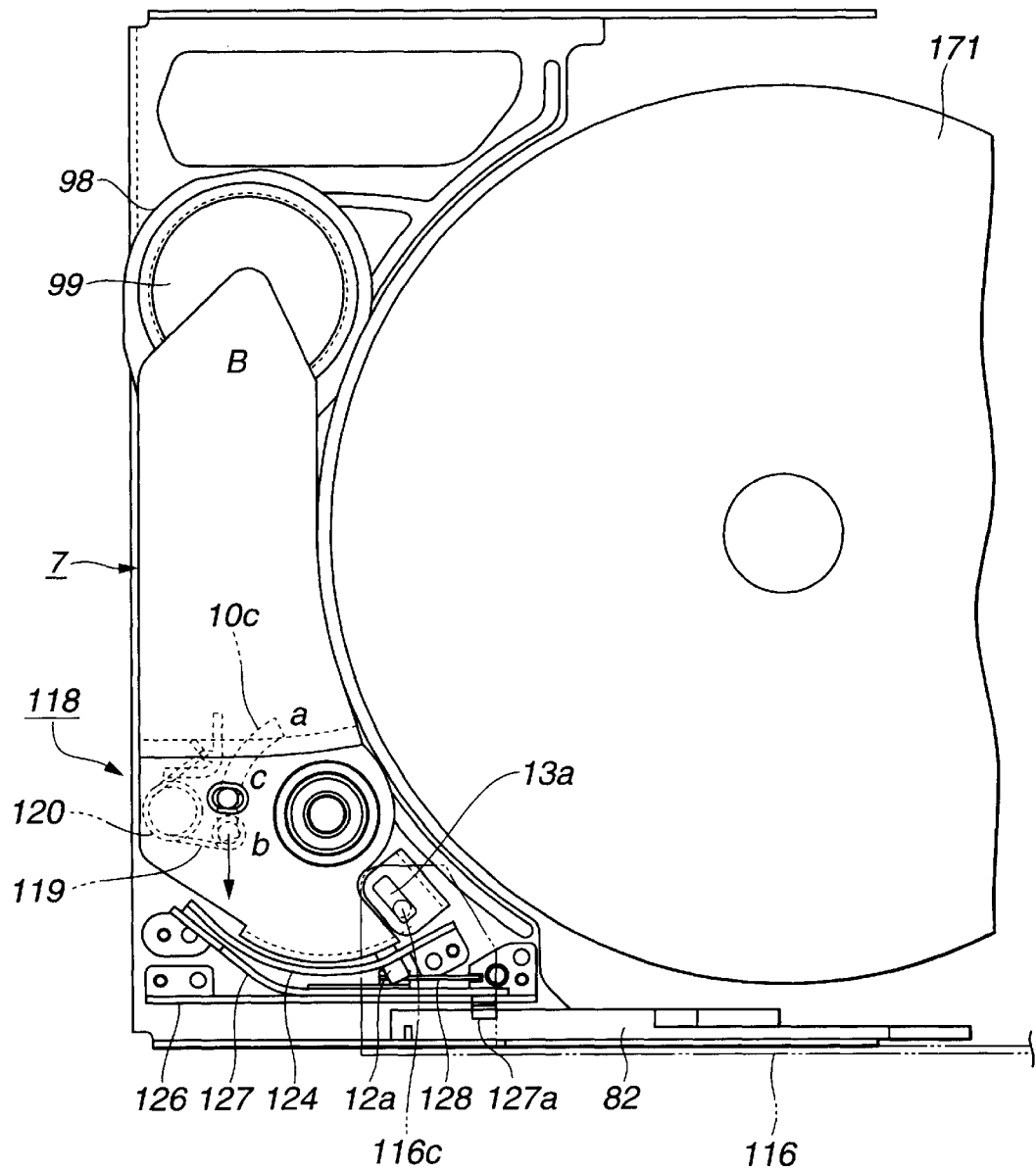
FIG. 37 is a view similar to FIG. 36, showing the hold means in the standby position.
Figure 38:
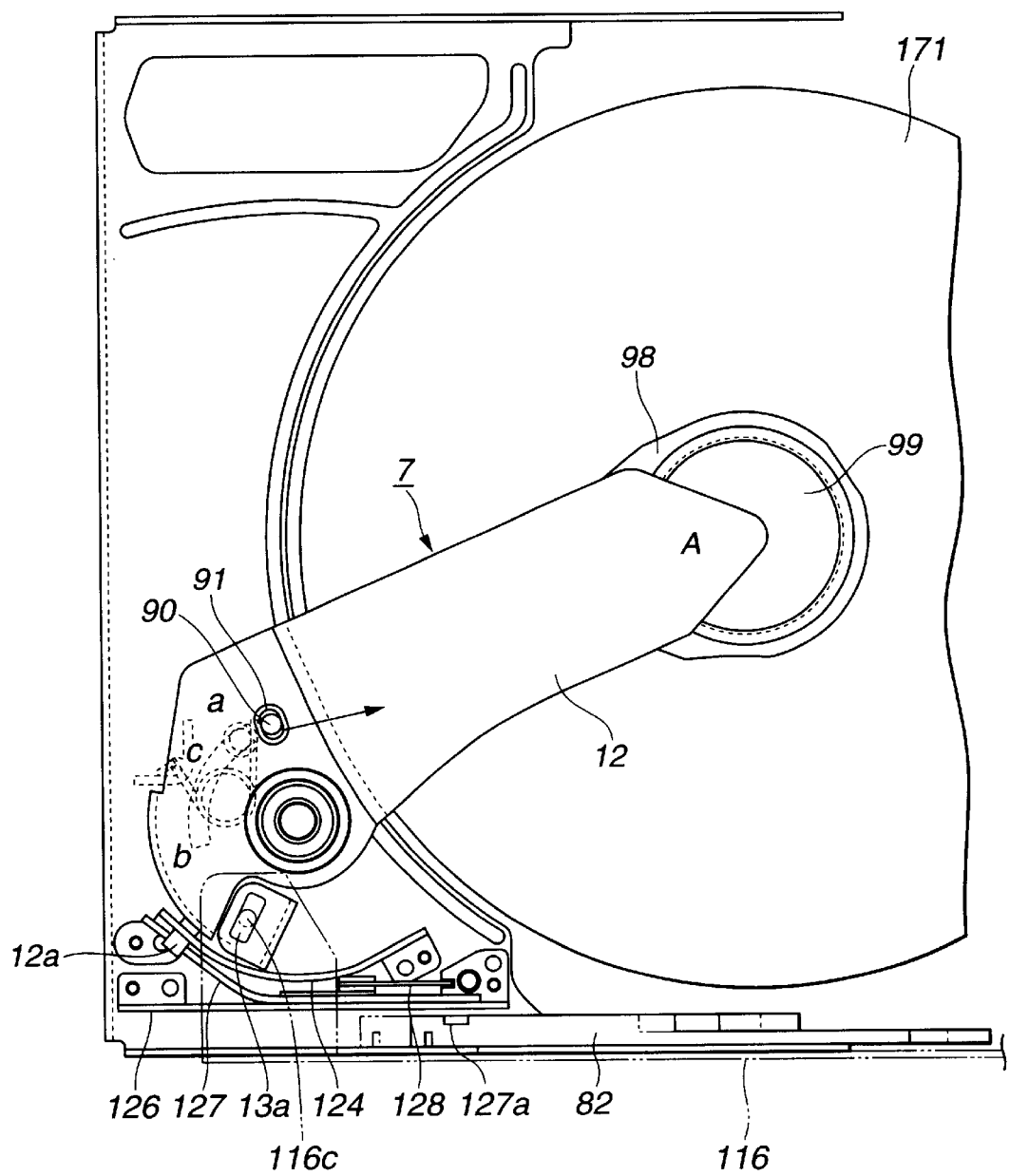
FIG. 38 is a view similar to FIG. 37, showing the hold means in the reproducing position.

The disc player has two modes, i.e. loading/unloading mode wherein CD is loaded and unloaded from the disc compartment 3 and reproducing mode wherein CD is reproduced. In the former mode, the hold means 14 are in a position B as shown in FIG. 37, whereas in the latter mode, the hold means are in a position A as shown in FIG. 38. Rotation of the hold means 14 between the position B and the position A is carried out through the torque providing means 17 as described above. Additionally, due to need of accurate positioning of the selected CD with respect to the turntable 97 on the lower arm 13, positioning means 118 are arranged as shown in FIGS. 17A–17B.

The configuration of the positioning means 118 will be described. As shown in FIGS. 16–17B, a positioning pin 119 protruding downward has an upper end secured to the lower arm 13 in the vicinity of the hollow shaft 86. A circular hole 10*c* is formed in the pickup lifting/lowering stage 10 in a portion thereof corresponding to the range that the positioning pin 119 moves in accordance with rotation of the hold means 14. The positioning pin 119 is loosely engaged with the circular hole 10*c*. A spring engagement 10*d* is formed with the pickup lifting/lowering stage 10 to protrude downward. Both ends of a toggle spring 120 are engaged with the positioning pin 119 and the spring engagement 10*d*. Assuming that the positioning pin 119 are in positions b, a when the hold means 14 are in the position B, A, a position c that is a midpoint between the position b and the position a corresponds to a point of inflection where the moving direction of the positioning pin 119 is changed, so that the spring engagement 10*d* is placed in a position corresponding to the position c.

Restriction Means

Figure 39A:
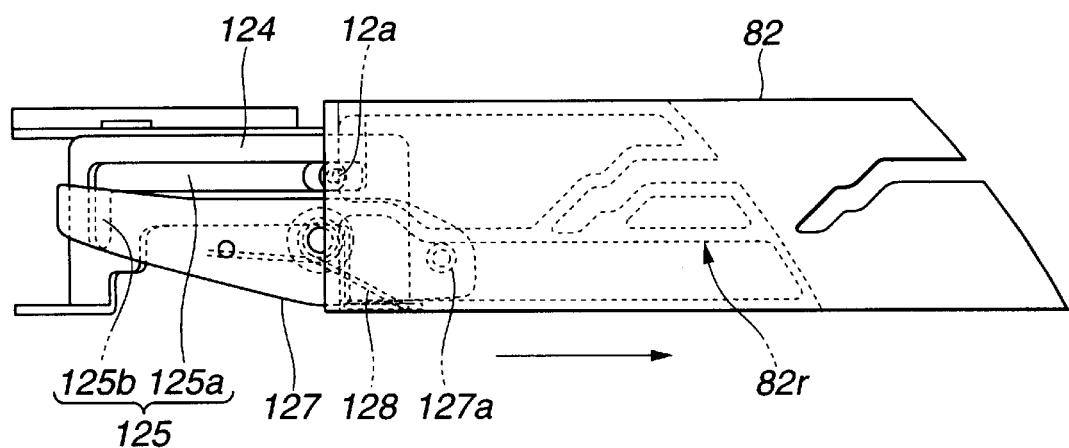
FIG. 39A is a view similar to FIG. 38, showing restriction means of the hold means in the standby position.
Figure 39B:
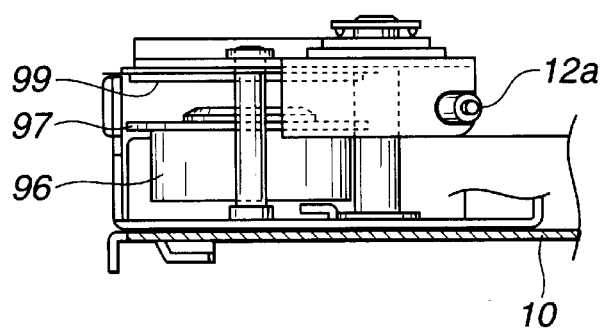
FIG. 39B is a view similar to FIG. 15, showing the restriction means of the hold means in the standby position.
Figure 40A:
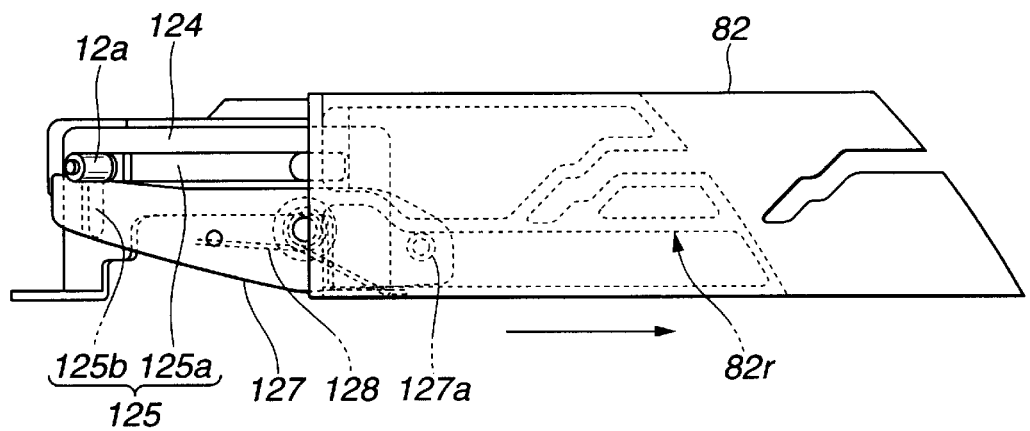
FIG. 40A is a view similar to FIG. 39B, showing the restriction means of the hold means in the reproducing position, wherein hold is blocked.
Figure 40B:
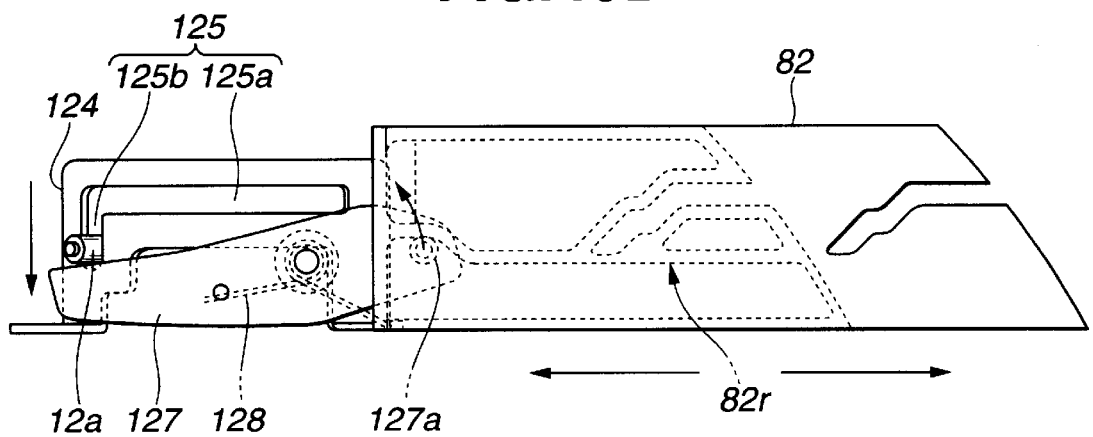
FIG. 40B is a view similar to FIG. 40A, showing the restriction means of the hold means in the reproducing position, wherein blocking is released.

The upper arm 12 of the hold means 14 is biased downward by the hold spring 89, and includes the restriction means 18 for setting a timing for lowering the upper arm 12 by a biasing force of the hold spring 89 as shown in FIG. 14. Specifically, a cylindrical plate 124 is provided on the top face of the pickup lifting/lowering stage 10 and between the hold means 14 and the separating cam 82. The cylindrical plate 124 forms a partial cylinder including part of a cylinder with center at the sleeve 87, and has an L-shaped guide slot 125 comprising a horizontal part 125*a* extending circumferentially and a vertical part 125*b* extending axially as shown in FIGS. 39A and 40A–40B. A guide pin 12*a* is secured to the base end of the upper arm 12 to protrude outward in the radial direction of the sleeve 87. The guide pin 12*a* is arranged through the guide slot 125. As a result, referring to FIG. 14, when the hold means 14 are in the position B or standby position and immediately before the hold means moved from the position B are in the position A or reproduction position, the guide pin 12*a* is positioned in the horizontal part 125*a* of the guide slot 125. Thus, even with a biasing force of the hold spring 89 being applied, the upper arm 12 is not lowered to allow the hold means 14 to be open. On the other hand, when the hold means 14 are in the position A, the guide pin 12*a* is positioned in the vertical part 125*b*, so that the upper arm 12 is lowered by a biasing force of the hold spring 89 to lower the guide pin 12*a* to a lower end of the vertical part 125*b*.

In order that the hold means 14 may not start hold operation as soon as the hold means 14 are rotated to the position A as shown in FIG. 14 to rotate the guide pin 12*a* to the vertical part 125*b* of the guide slot 125, but may start hold operation only after receiving a command, there are arranged first restriction means for temporarily restricting downward movement of the guide pin 12*a*, and second restriction means for releasing temporary restriction to hold the selected CD when forward movement of the separating cam 82 after temporary restriction causes the selected CD and tray 2 to be lowered and placed on the turntable 97. Specifically, a bearing plate 26 is provided on the top face of the pickup lifting/lowering stage 10 and between the cylindrical plate 124 and the separating cam 82 to be parallel to the separating cam 82 as shown in FIGS. 14 and 37. As shown in FIG. 14, a middle portion of a restraining lever 127 is rotatably supported by the inside of the bearing plate 126 through a rotation shaft 129, and a pin 127*a* is secured to the restraining lever 127 in the front portion thereof to protrude outward. A rear portion of the restraining lever 127 is bent inward to face the vertical part 125*b* of the guide slot 125. As shown in FIG. 37, a spring 128 is arranged to bias the rear portion of the restraining lever 127 downward. The pin 127a in the front portion of the restraining lever 127 is loosely engaged with a cam groove 82r formed in the lower inside of the separating cam 82 as shown in FIG. 39A. An escape is formed in an upper rear portion of the cam groove 82r. When the separating cam 82 is moved forward to engage the pins 2j, 2k of the selected tray 2 with the middle engagements 82k, the pin 127a can escape into the escape of the cam groove 82r. Then, the restraining lever 127 is rotated by the spring 128, and the upper arm 12 is lowered by a biasing force of the hold spring 89.

G) Push Means

The push means 8 are arranged inside the casing 1 on both sides thereof. Since the two push means 8 are substantially the same in configuration, one of which will be described. As show in FIGS. 1 and 26A, a push lever 132 for pushing CD is rotatably mounted to a stationary shaft 133 that protrudes downward from the top plate 1d of the casing 1. The push lever 132 is at the same level as that of the boundary between the rollers 35, 36. A return spring 134 is arranged to enclose the stationary shaft 133, and has both ends engaged with a spring engagement 132a of the push lever 132 and a spring engagement of the top plate 1d. The push lever 132 is rotated by backward movement of the separating cam 82 as described above, which is the direction opposite to that for space formation by forward movement thereof. Specifically, as shown in FIG. 14, a plate 135 is arranged outside the bearing plate 126 to be slidable longitudinally by a predetermined amount. That is, a pair of guide slots 126a is formed in the bearing plate 126, and a pair of guide pins 135a is arranged through the pair of guide slots 126a and secured to the plate 135. The plate 135 has a front side end bent inward to be engageable with a pressed portion 132b integrated with the push lever 132, and a rear side end bent outward to protrude behind the separating cam 82.

H) Operation Means

Finally, the operation means 9 will be described. In the loading/unloading mode, the operation means 9 lift and lower the disc lifting/lowering stage 22 to allow loading and unloading of CD on the tray 2. and also operate the opening/closing means 6 and the push means 8. In the reproducing mode, the operation means 9 lift and lower the pickup lifting/lowering stage 10 to take the selected CD with the disc lifting/lowering stage 22 maintained in the lowermost position, and also operate the space defining means 11 and the restriction means 18.

Figure 18A:
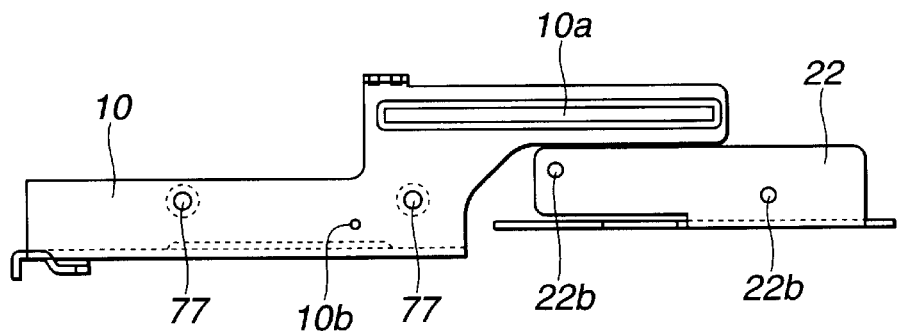
FIG. 18A is a view similar to FIG. 11B, showing a pickup lifting/lowering stage and a tray lifting/lowering stage of operation means.
Figure 18B:
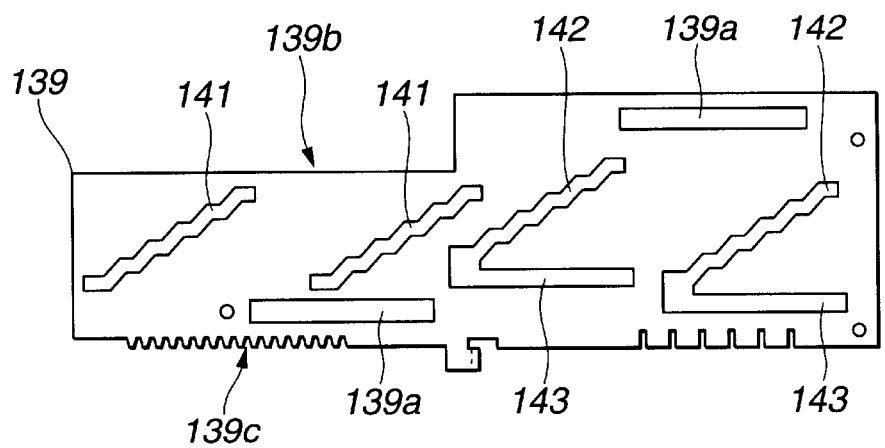
FIG. 18B is a view similar to FIG. 18A, showing an inner slider of the operation means.
Figure 18C:
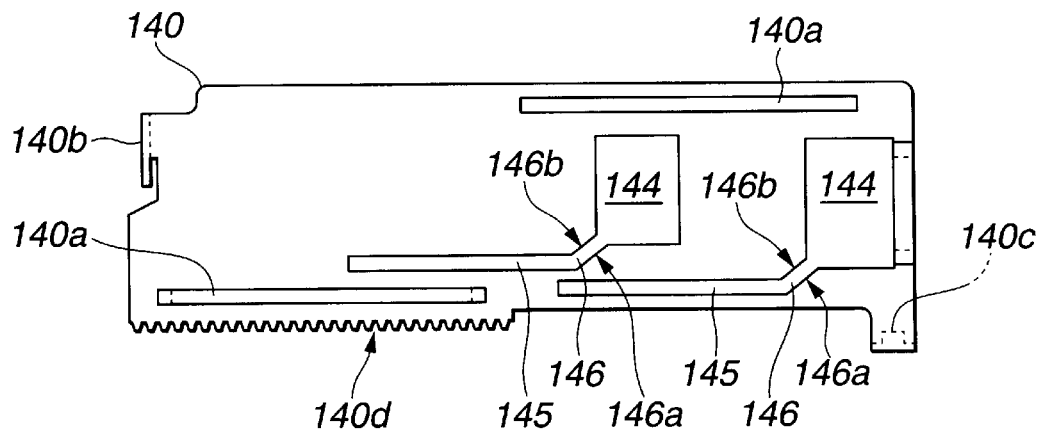
FIG. 18C is a view similar to FIG. 18B, showing an outer slider of the operation means.

As shown in FIGS. 2 and 18B–18C, a pair of inner and outer sliders 139, 140 is longitudinally slidably arranged outside the right and left side plates 1c, 1b of the casing 1. Guide slots 139a, 140a are formed in the sliders 139, 140 in upper and lower portions thereof. Guide pins 158, 159 are arranged through the guide slots 139a, 140a and secure to the side plate, and have retaining rings mounted thereto. A pair of stepped slits 141 is formed in the inner slider 139 in a rear portion thereof to lift and lower in a six-step way the pair of pins 77 of the pickup lifting/lowering stage 10 protruding from the vertical slit 78. A pair of stepped slits 142 is formed in the inner slider 139 in a front portion thereof to lift and lower in a six-step way the pair of pins 22b of the disc lifting/lowering stage 22 protruding from the vertical slit 25. A bottom slit 143 is continuously formed below each stepped slit 142 to lift and lower only the pickup lifting/lowering stage 10 in the reproducing mode with the disc lifting/lowering stage 22 maintained in the lowermost position. On the other hand, only a pair of slits for receiving the pair of long pins 22b of the disc lifting/lowering stage 22 is formed in the outer slider 140. Specifically, each slit includes a square loading/unloading-mode slit portion 144 for moving upward and downward the pin 22b received in the stepped slit 142, a horizontally extending reproducing-mode slit portion 145 for holding in the lowermost position the pin 22b received in the bottom slit 143, and a 45° inclined switching slit portion 146 for switching the position of the pin 22b between the stepped slit 142 and the bottom slit 143 by moving the pin 22b upward or downward through taper faces 146a, 146b by slide operation of the outer slider 140 in any direction. If the reproducing-mode slit portions 145 are formed in the same vertical position, they are superimposed one upon another. Thus, the reproducing-mode slit portions 145, the loading/unloading-mode slit portions 144, the bottom slits 143, the stepped slits 142, and the pins 22b inserted therein are positioned at different levels.

An upper portion of the outer slider 140 is bent inward orthogonally to form a protrusion 140b. In order to allow movement of the protrusion 140b together with the outer slider 140, an escape recess 139b and an escape slit 147 are formed in the inner slider 139 and the side plate 1b in rear portions thereof, respectively. In order that the separating cam 82 may slide together with the outer slider 140 regardless of the level of the separating cam 82 that lifts and lowers with the pickup lifting/lowering stage 10, a vertical engagement groove 82s is formed in the rear outside of the separating cam 82 as shown in FIG. 2, with which the protrusion 140b is engaged slidably. An engagement 140c is formed with the left outer slider 140 in a front portion thereof to extend below the bottom plate 1e of the casing 1. When the outer slider 140 is slid backward, the engagement 140c presses the pressed portion 70c backward to open the shutter 64 against a biasing force of the return spring 69.

A drive mechanism will be described, which serves to simultaneously synchronously slide the pair of inner and outer sliders 139, 140. As shown in FIGS. 2 and 13, two connecting shafts 148, 149 are rotatably supported below the bottom plate 1e of the casing 1 in a rear portion thereof through two pairs of bearings. Pinions 150, 151 are secured to both ends of the connecting shafts 148, 149, and are meshed with racks 139c, 140c formed with the inner and outer sliders 139, 140 on rear lower faces thereof. Gears 152, 153 are secured to the connecting shafts 148, 149, and are individually coupled with operating motors 154, 155. That is, the operating motors 154, 155 are mounted to upper and lower inside portions of the bearing plate 126 disposed in the rear portion of the casing 1, and have output shafts coupled with the gears 152, 153 through two sets of reduction means 156, 157 arranged inside the bearing plate 126.

Next, operation of the disc player will be described.

1) General Outline of Operation

Operation of the disc player is composed of three functions: loading of CDs into the disc compartment 3, unloading of CDs from the disc compartment 3, and reproduction of a selected CD from the CDs stored in the disc compartment 3.

2) CD Loading

Figure 19:
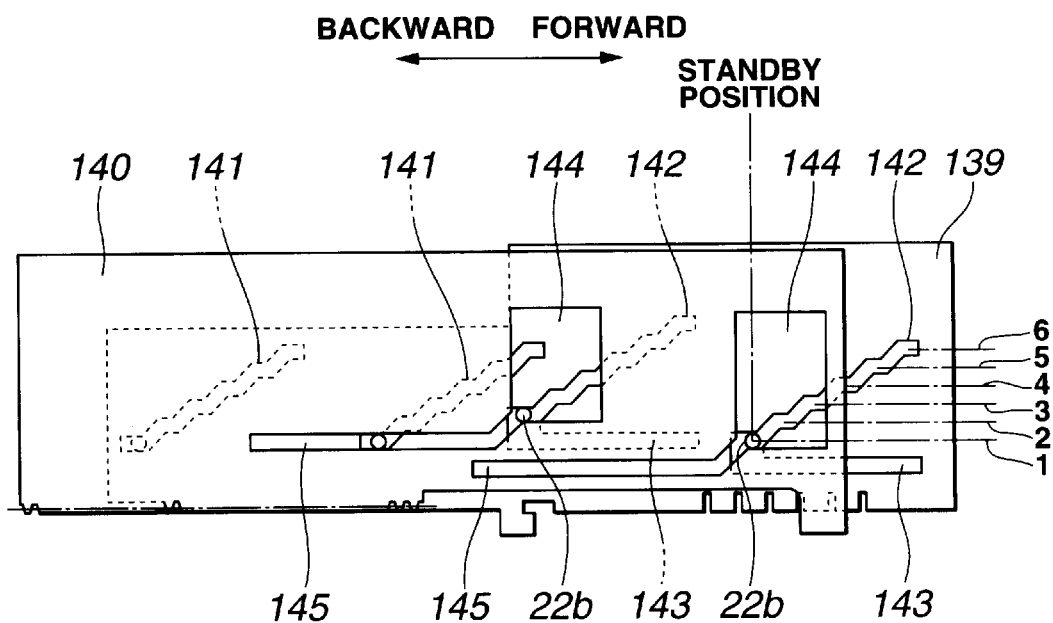
FIG. 19 is a schematic drawing for explaining operation of the operation means in the mode switching position in the disc loading/unloading mode.
Figure 20A:
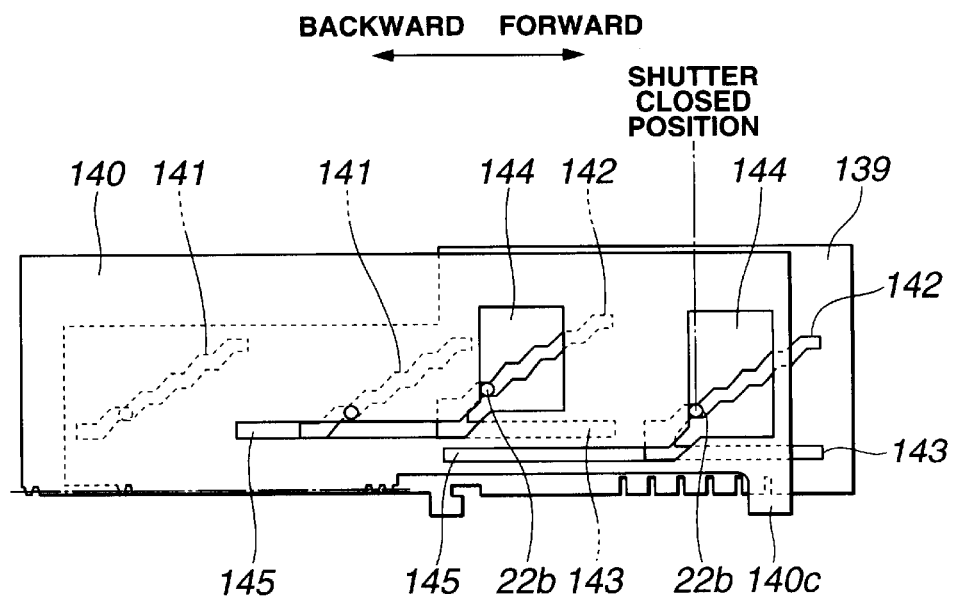
FIG. 20A is a view similar to FIG. 19, for explaining operation of the operation means in the standby position, wherein a second disc is selected.

When loading CD into the disc compartment 3, the tray number, e.g. No. 2 (the numbers 1–6 are assigned to the trays 2 from top to bottom) is selected to push a corresponding number button, not shown, before pushing a loading button, not shown. Rotation of an output shaft of the operating motor 154 is transmitted to the reduction means 156 and the connecting shaft 148 to slide the inner sliders 139. Independently, rotation of an output shaft of the operating motor 155 is transmitted to the reduction means 157 and the connecting shaft 149 to slide the outer sliders 140. When pushing the button with the pins 22b entering the loading/ unloading slit portions 144 of the outer slider 140 as shown in FIG. 19, for example, to be in the mode switching position in the loading/unloading mode, backward movement of the inner slider 139 raises the pins 22b to the second step of the stepped slits 142 from below as shown in FIG. 20A, which raises the disc lifting/lowering stage 22 to set CD on the second tray 2 at the level of the push lever 132. At that time, the pickup lifting/lowering state 10 is raised simultaneously, which forms needless movement. Further backward movement of the inner slider 139 raises the pickup lifting/lowering stage 10 together with the pins 22b to have the third to sixth trays 2 at the level of the push lever 132 successively.

When the outer slider 140 is moved backward from the standby position as shown in FIG. 20A to have the pins 22b in the longitudinal middle position of the loading/unloading-mode slit portions 144, the engagement 140c of the outer slider 140 presses backward the pressed portion 70c (see FIG. 2) below the bottom plate 1e. Thus, movement of the longitudinally slide plate 70 is transmitted, through the lever 72, to the laterally slide plate 66 which is moved leftward against a biasing force of the return spring 69, raising the shutter 64 to open the loading/unloading opening 4 as shown in FIG. 24B.

Figure 24A:
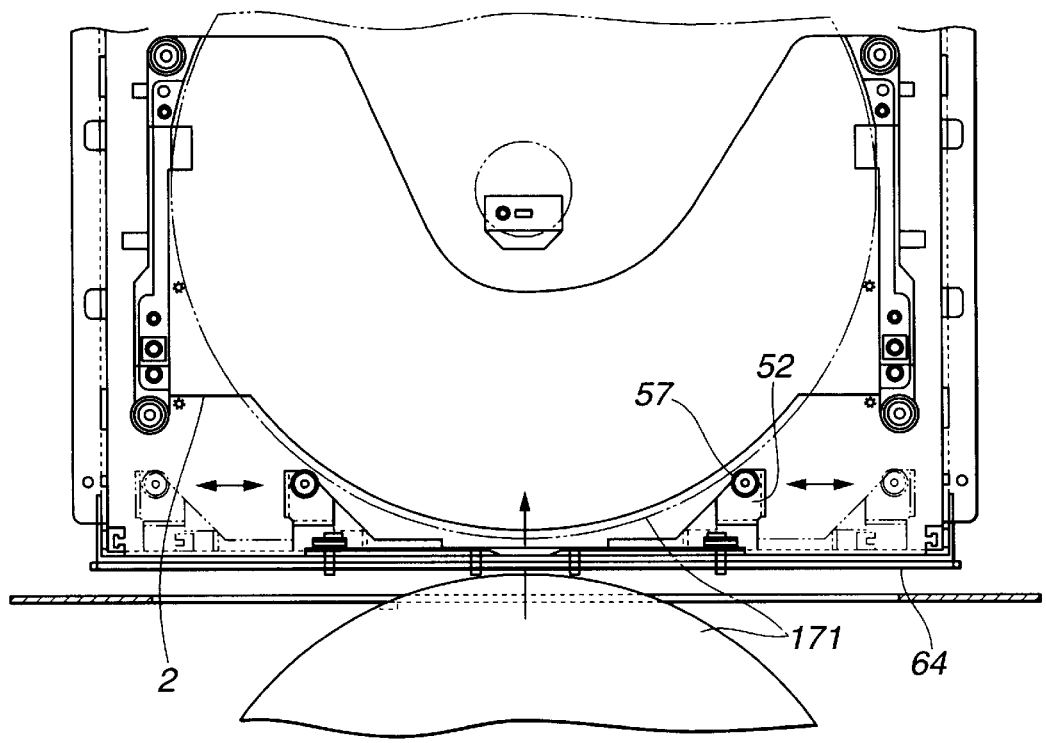
FIG. 24A is a view similar to FIG. 16, showing the disc player upon disc loading.
Figure 24B:
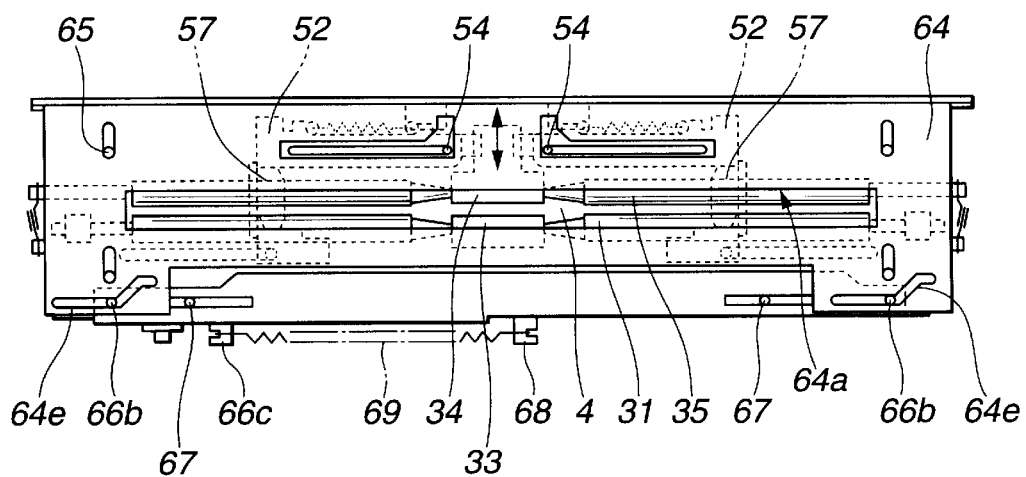
FIG. 24B is a view similar to FIG. 18C, showing the disc player upon disc loading.
Figure 25:
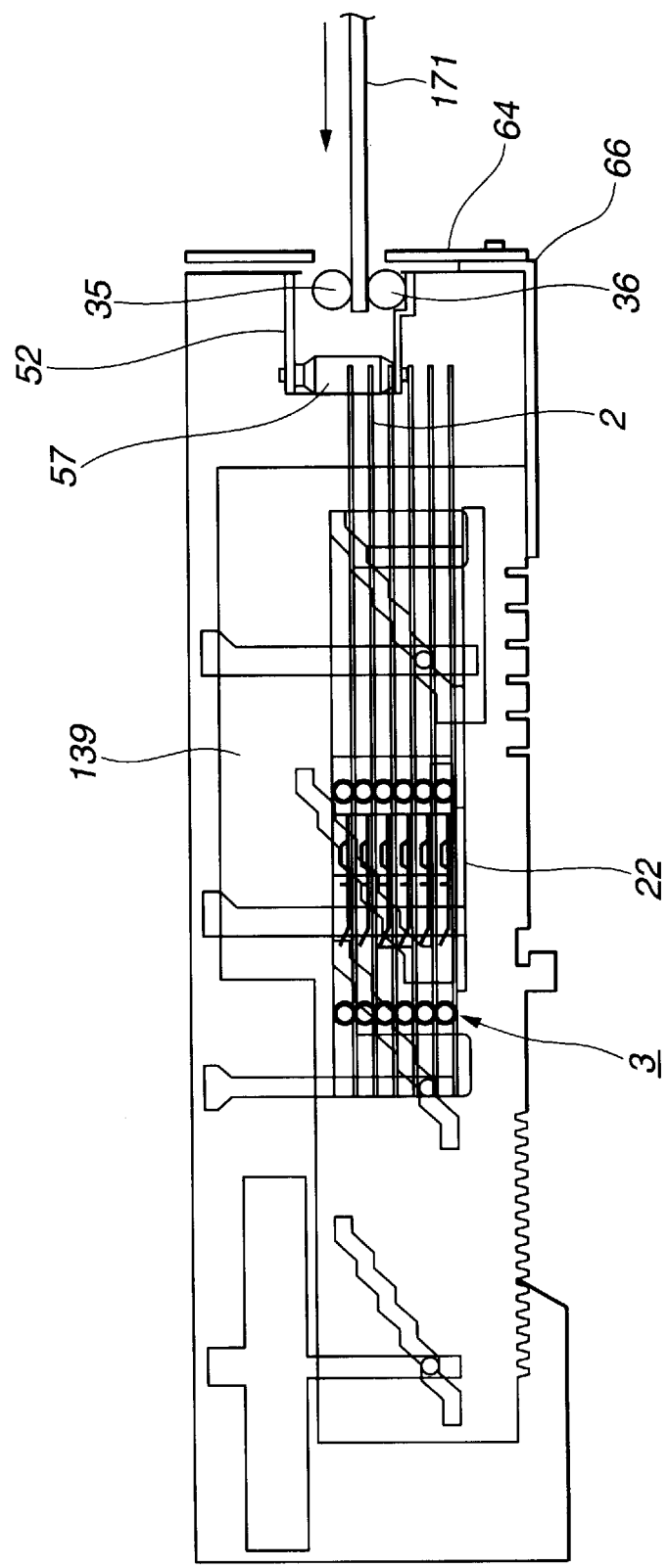
FIG. 25 is a longitudinal section showing the disc player upon disc loading.

The shutter 64 is opened, and the second tray 2 is at the same level of the push lever 132, so that when inserting a CD 171 between the rollers 35, 36 as shown in FIG. 24A, a sensor, not shown, disposed in front of the shutter 64 senses the CD 171 to rotate the transfer motor 46. Since torque from the transfer motor 46 is transmitted to the roller 36 through the gears, the CD 171 is bitten between the roller 36 and the roller 35 biased thereto by the spring 38, and is loaded onto the second tray 2 by rotation of the rollers 35, 36. As being not fully inserted by the rollers 35, 36, the CD 171 is pushed by last several millimeters in the center direction by the vertical rollers 57 biased by the push spring 60. The CD 171 is held on the tray 2 by the pressers 2n of the plate springs 2m. When the CD 171 separates from the rollers 35, 36, a limit switch, not shown, operates to stop rotation of the transfer motor 46, which causes simultaneously the outer sliders 140 to move forward and return to the standby position as shown in FIG. 20A. Thus, the pressed portion 70c that has been pressed backward is released to close the shutter 64 through operation of the return spring 69.

When the pins 22b are in any other position, i.e. one of the first and third to sixth step of the stepped slit 142 from below, CD can be loaded in the disc compartment 3 in the same way.

3) CD Unloading

Figure 20B:
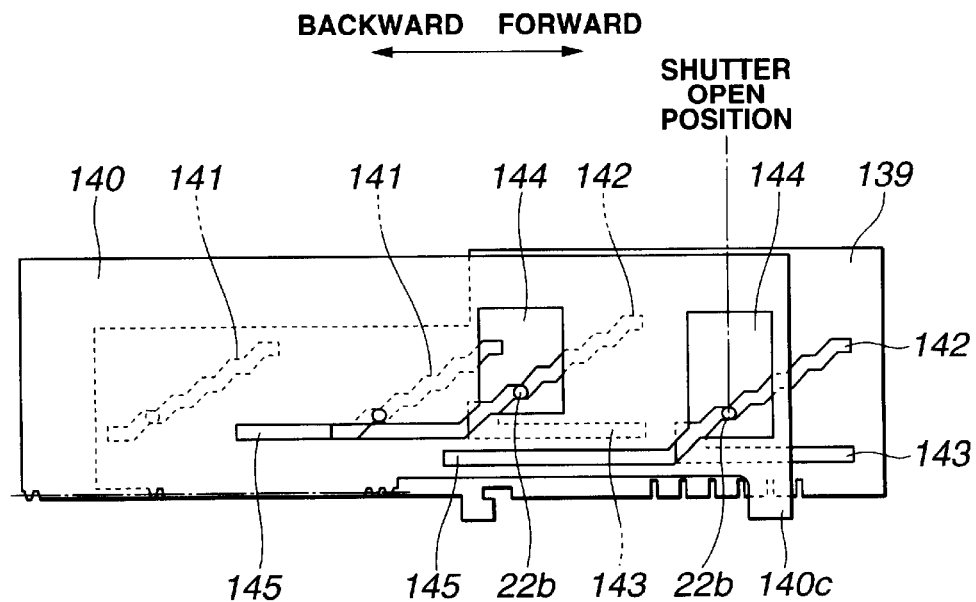
FIG. 20B is a view similar to FIG. 20A, for explaining operation of the operation means with a shutter opened, wherein the second disc is loaded and unloaded.

When unloading CD from the disc compartment 3, the number button of, e.g. No. 2, is pushed together with an unloading button. Then, in the same way as upon loading, the pins 22b are moved from the mode switching position in the loading/unloading mode as shown in FIG. 19 to the standby position as shown in FIG. 20A so as to set CD on the second tray 2 at the level of the push lever 132. And when the outer slider 140 is moved backward to the position as shown in FIG. 20B in the same way as described above, the shutter 64 is opened. Operation up to here is quite the same as that upon CD loading.

Figure 21:
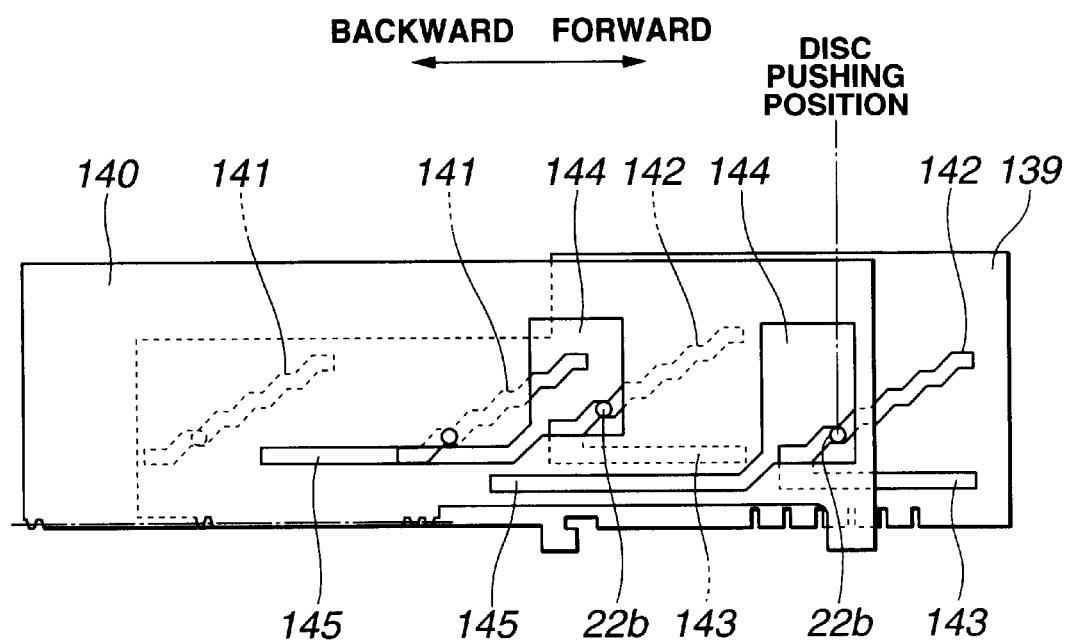
FIG. 21 is a view similar to FIG. 21B, for explaining operation of the operation means with a push lever rotated, wherein the second disc is unloaded.
Figure 26A:
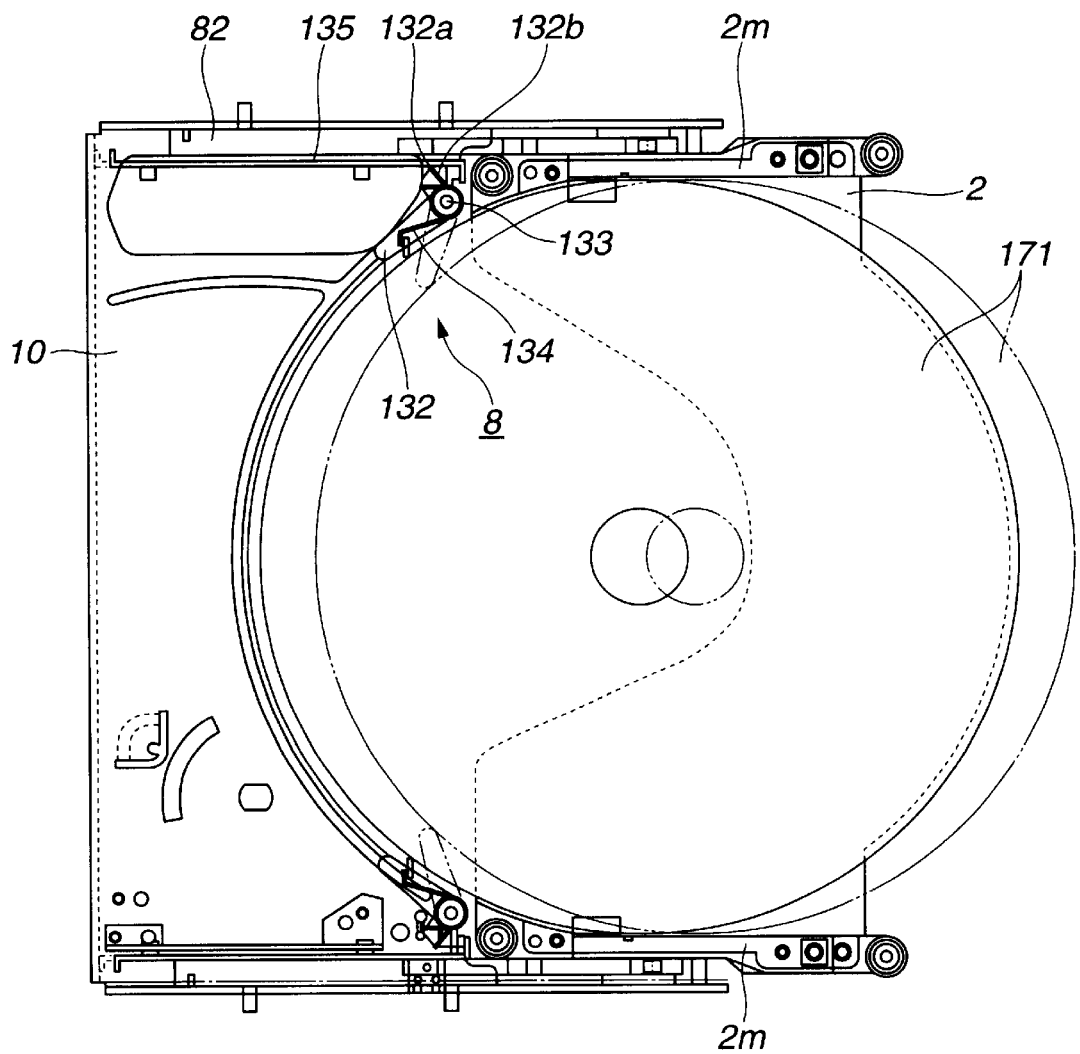
FIG. 26A is a view similar to FIG. 24A, showing push means upon disc unloading.
Figure 26B:
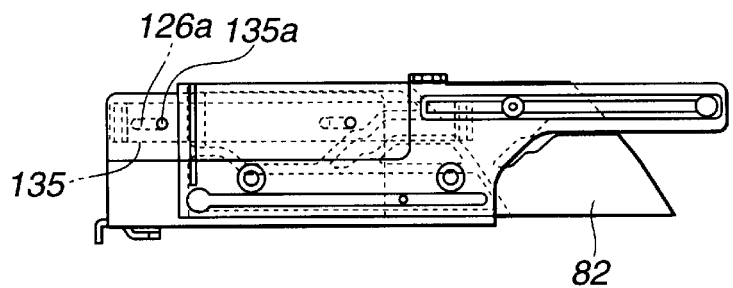
FIG. 26B is a view similar to FIG. 24B, showing the push means upon disc unloading.
Figure 27:
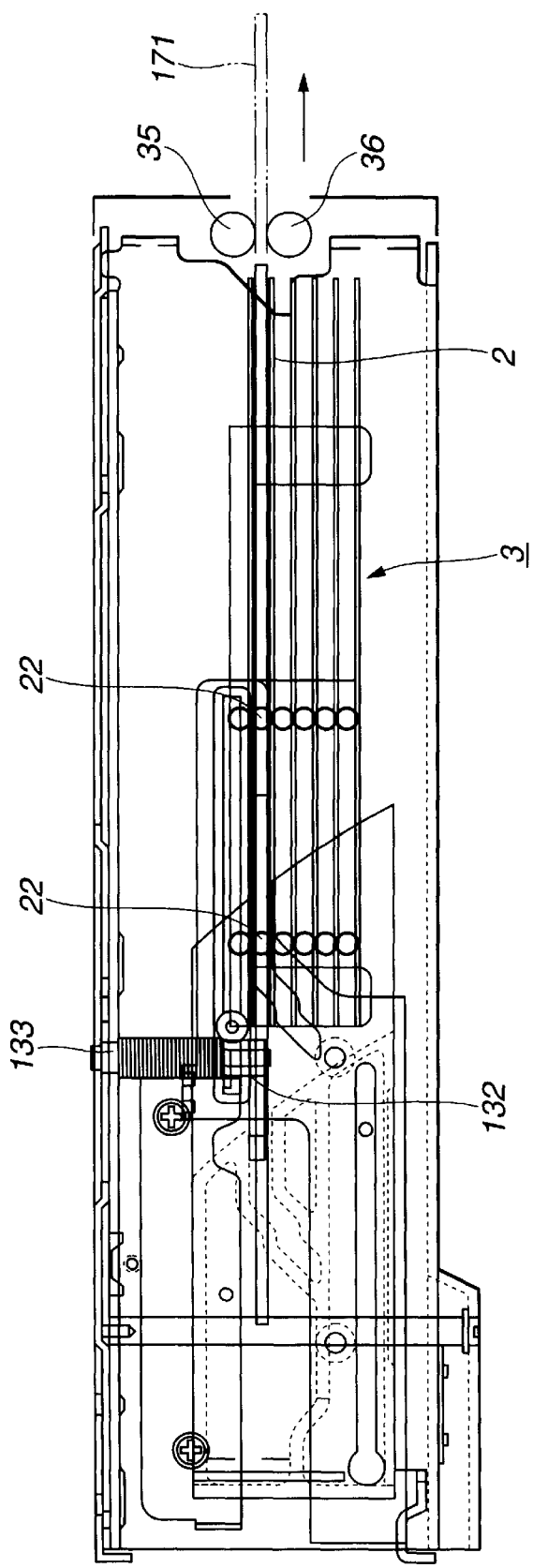
FIG. 27 is a view similar to FIG. 25, showing the push means upon disc unloading.

When the outer slider 140 is moved backward further until the pins 22b become in the front of the loading/unloading-mode slit portions 144 as shown in FIG. 21, the separating cam 82 operating with the outer slider 140 through the protrusion 140b of the outer slider 140 is moved backward as shown in FIGS. 26A–26B so that the rear face of the separating cam 82 presses the rear face of the plate 135 for backward movement. Then, the front face of the plate 135 presses the pressed portion 132b of the push lever 132 backward to rotate the push lever 132 so as to push both sides of the CD 171 on the second tray 2. Since the transfer motor 46 is driven to rotate the rollers 35, 36 at the instant when pushing the unloading button, the pushed CD 171 is unloaded in being held between the rollers 35, 36 as shown in FIG. 27. In order to prevent the CD 171 from falling upon unloading, a limit switch, not shown, detects the CD 171 when a rear portion thereof is partly held between the rollers 35, 36 to stop rotation of the transfer motor 46. After this, the CD 171 is removed manually between the rollers 35, 36. When a sensor, not shown, senses a removal of the CD 171, the outer sliders 149 are moved forward to return the pins 22b from the position as shown in FIG. 21 to the standby position as shown in FIG. 20A.

Then, due to elimination of a backward force applied to the plate 135 from the separating cam 82, the push lever 132 is rotated by a biasing force of the return spring 134 to return to an initial position as indicated by fully drawn line in FIG. 26A, then the shutter 64 is closed in the same way as after CD loading.

When the pins 22b are in any other position, i.e. one of the first and third to sixth step of the stepped slit 142 from below, CD can be unloaded from the disc compartment 3 in the same way.

4) CD Reproduction

Figure 22A:
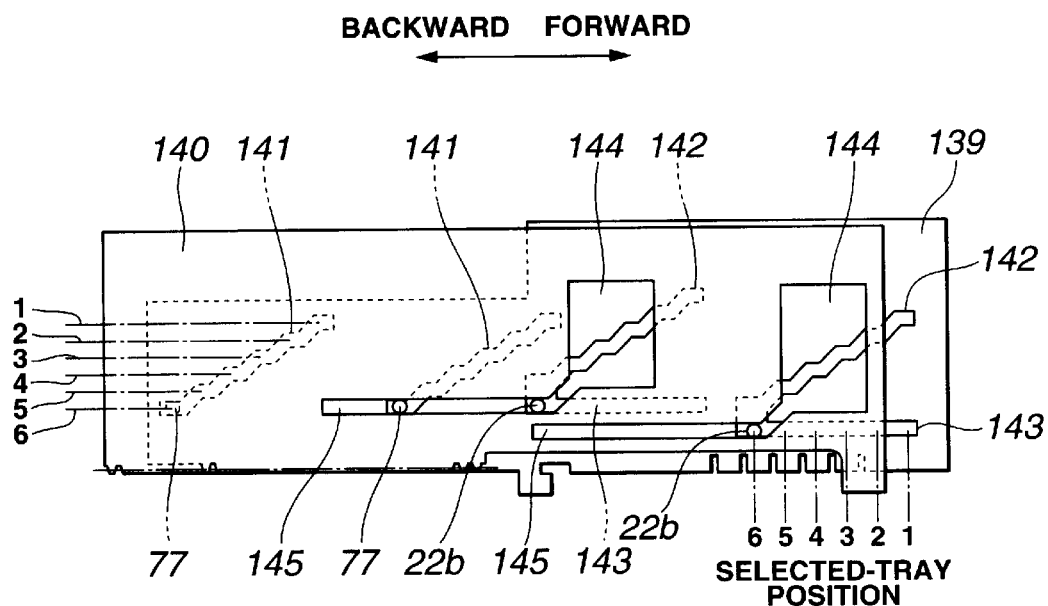
FIG. 22A is a view similar to FIG. 21, for explaining operation of the operation means in the disc reproducing mode, wherein a sixth disc is reproduced.

When reproducing CD, the number button of, e.g. No. 2, of the selected CD is pushed together with a reproduction button. Then, the inner slider 139 is moved forward from the position as shown in FIG. 20A to lower the pins 22b to the mode switching position via the lowermost position of the loading/unloading-mode slit portions 144 as shown in FIG. 19 before the outer slider 140 is moved forward. The upper taper faces 146b of the switching slits 146 (see FIG. 18C) are pressed to lower the pins 22b. As soon as the pins 22b are moved to the bottom slits 143, they are moved into the reproducing-mode slit portions 145 of the outer slider 140 to achieve switching to the reproducing mode as shown in FIG. 22A. Upon switching, the pins 77 of the pickup lifting/lowering stage 10 remain in the lowermost position of the stepped slits 141. At that time, the pins 22b are positioned in the switching position from the reproducing mode to the loading/unloading mode. In this state, when moving the outer sliders 140 backward, the lower taper faces 146a of the switching slits 146 are pressed to raise the pins 22b which can thus return to the mode switching position in the loading/unloading mode as shown in FIG. 19.

Figure 22B:
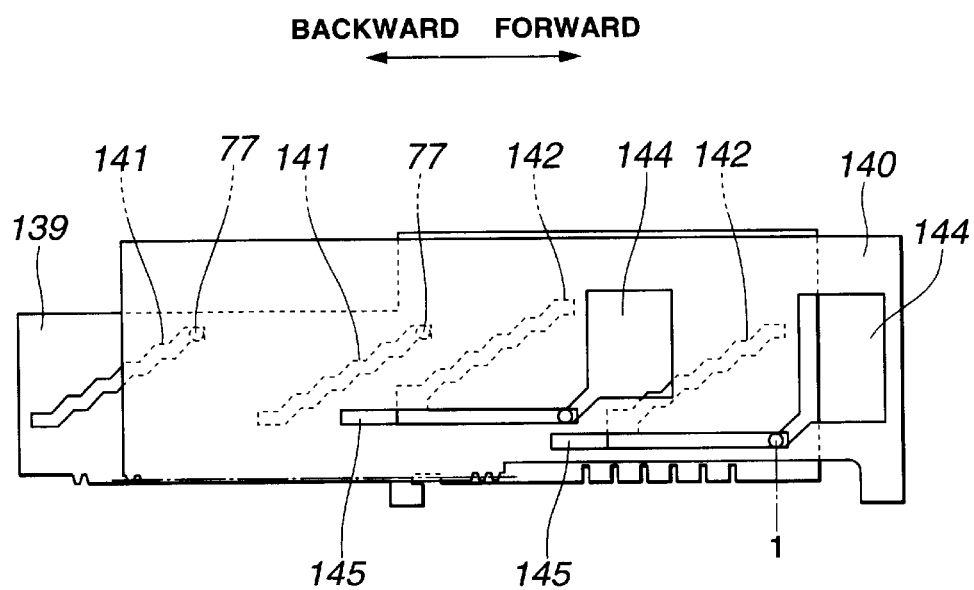
FIG. 22B is a view similar to FIG. 22A, for explaining operation of the operation means in the disc reproducing mode, wherein a first disc is reproduced.

The position of the pins 22b with respect to the outer sliders 140 as shown in FIG. 22A corresponds not only to the mode switching position, but the CD selecting position where CD to be reproduced is selected by changing only the level of the pickup lifting/lowering stage 10. Specifically, if only the inner sliders 139 are moved backward from the position as shown in FIG. 22A, the pins 22b are apparently moved forward along the bottom slits 143, but are actually held in the lowermost position of the vertical slits 25, obtaining no movement of the disc lifting/lowering stage 22 from the lowermost reproduction position. On the other hand, the pins 77, not seen in FIG. 22A due to presence of the outer sliders 140, are apparently relatively lifted along the stepped slits 141, but are actually lifted stepwise along the vertical slits 78. That is, when the pins 22b are positioned in the position of any of the numbers 1–6 assigned to the bottom slits 143 by moving the inner sliders 139 backward, the pins 77 are lifted or lowered at the level of the corresponding one of the number 1–6 assigned vertically to the stepped slits 142 as shown in FIG. 19, allowing reproduction of CD of the corresponding number. FIG. 22A illustrates the state where No. 6 CD can be reproduced, and FIG. 22B illustrates the state where No. 1 CD can be reproduced.

Figure 23A:
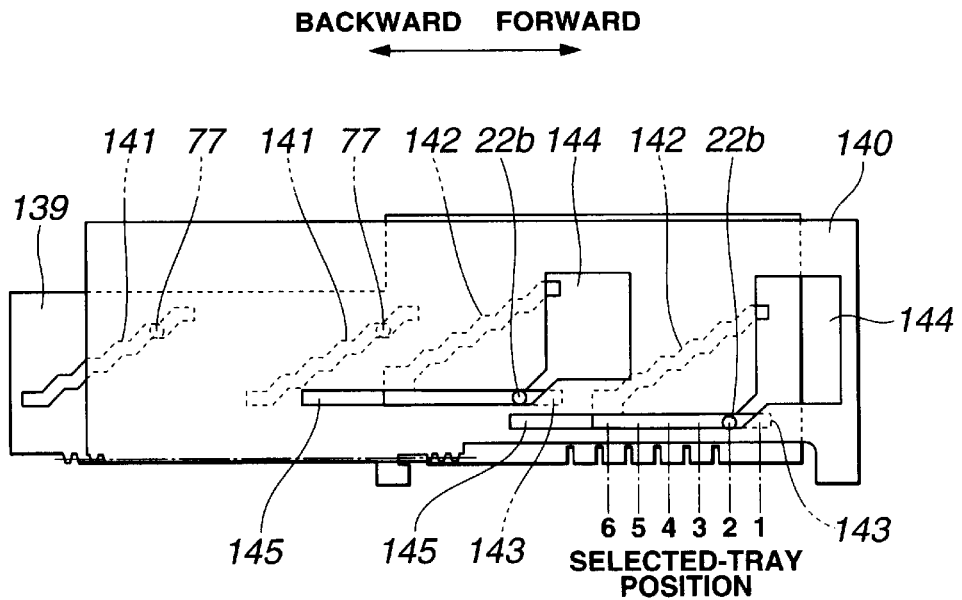
FIG. 23A is a view similar to FIG. 22B, for explaining operation of the operation means when a pin is in a position D or standby position, wherein the second disc is reproduced.

Here, No. 2 CD is selected as described above, so that the pins 77 are lifted to the second position from above as shown in FIG. 23A. The above operation allows CD reproduction. Subsequent operation is the same with CD of any number selected, and is ensured by movement of the outer sliders 140 and driving of the transfer motor 46.

Figure 29:
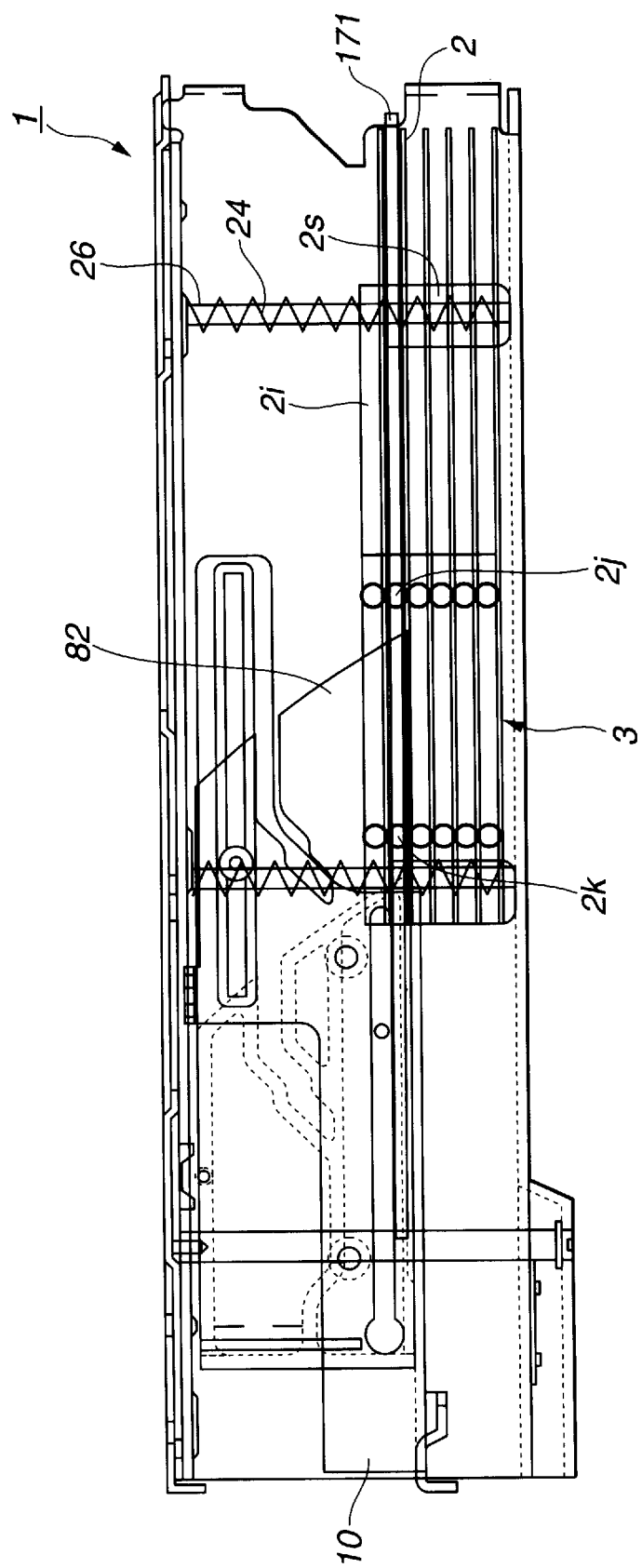
FIG. 29 is a side view showing the trays before being separated by the separating cam.
Figure 30:
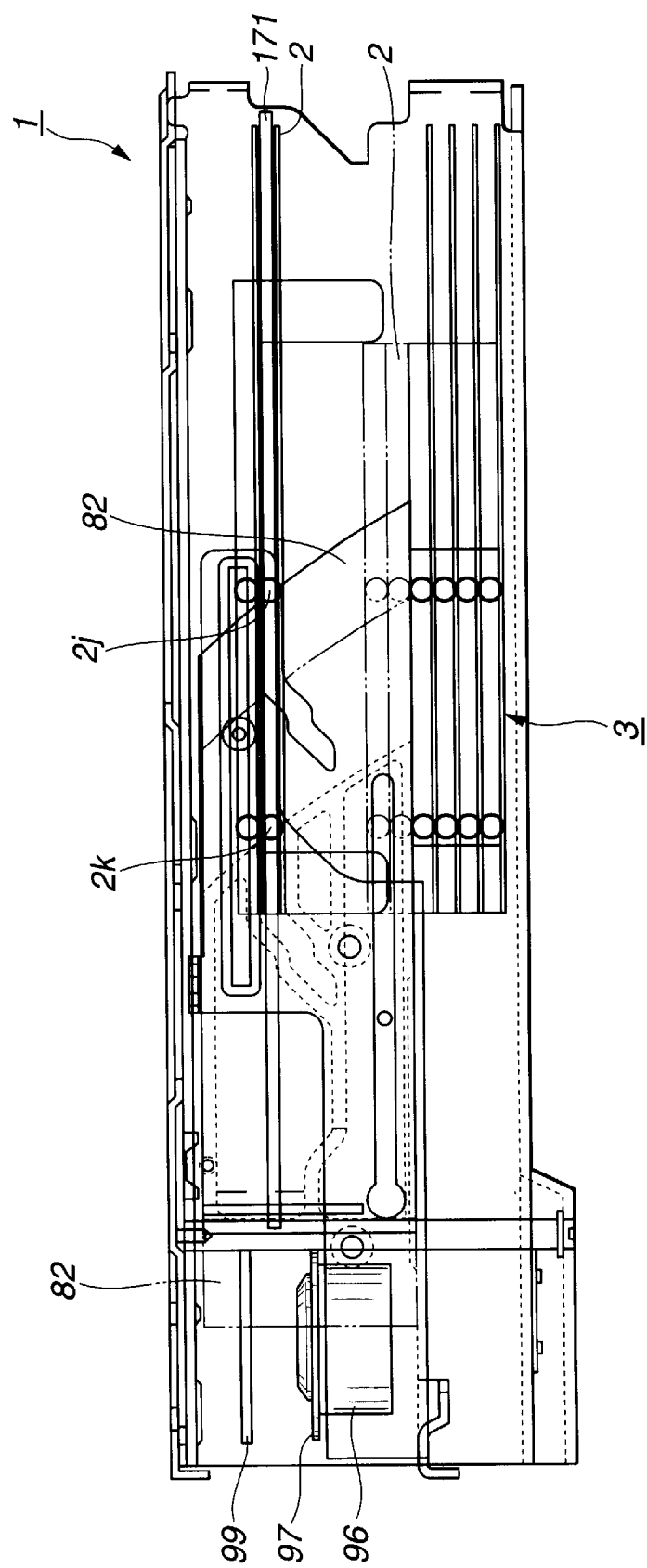
FIG. 30 is a view similar to FIG. 29, showing the trays separated into two groups by the separating cam.
Figure 31:
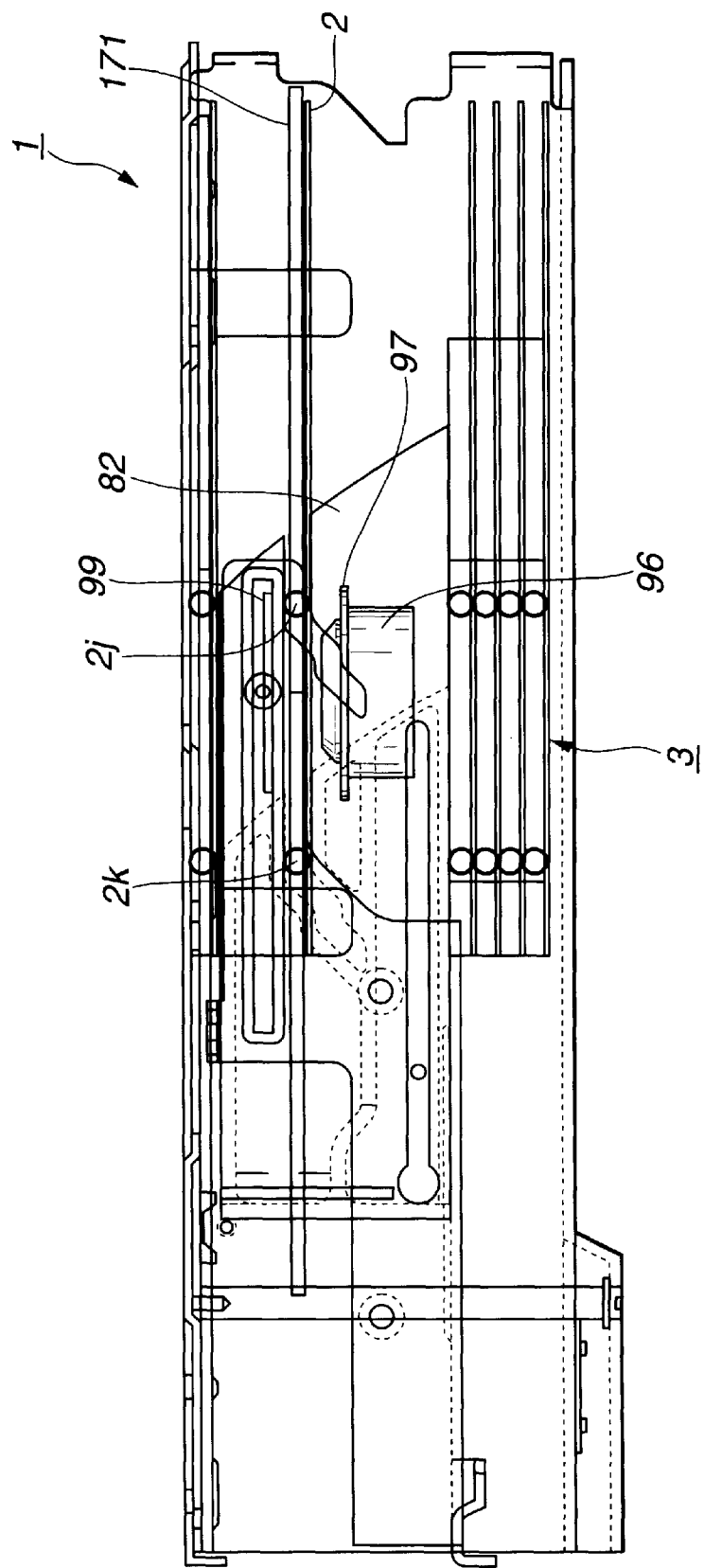
FIG. 31 is a view similar to FIG. 30, showing the trays separated into three groups by the separating cam.

Operation of the device will be described after the standby state as shown in FIG. 23A where No. 2 CD is selected for reproduction. The standby state refers to the state when each pin 22b is in a position D on the outer slider 140 as shown in FIG. 23A, wherein the separating cam 82 is positioned as shown in FIG. 29. When the outer slider 140 is moved forward to bring the pin 22b to a position E as the first step, the separating cam 82 is moved forward to have the lower rear head introduced between the pins 2k of the second and third trays 2 as shown in FIG. 28A (and also the lower front head introduced between the pins 2j for the same subsequent operation as that of the pins 2k). The pin 2k of the second tray 2 is slid along the first separating control part $82c_1$ to be on the upper engagement 82j, and the upper head of the separating cam 82 is introduced between the pins 2k of the first and second trays 2, falling in the state as shown in FIG. 30. When the pin 22b is in a position G as the third step, the pin 2k of the first tray 2 is slid along the second separating control part $82c_2$ to be on the top face 82f of the separating cam 82. As a result, when pin 22b is in a position G as the third step, a space is defined above and below the selected second tray 2 as shown in FIG. 31.

Figure 23B:
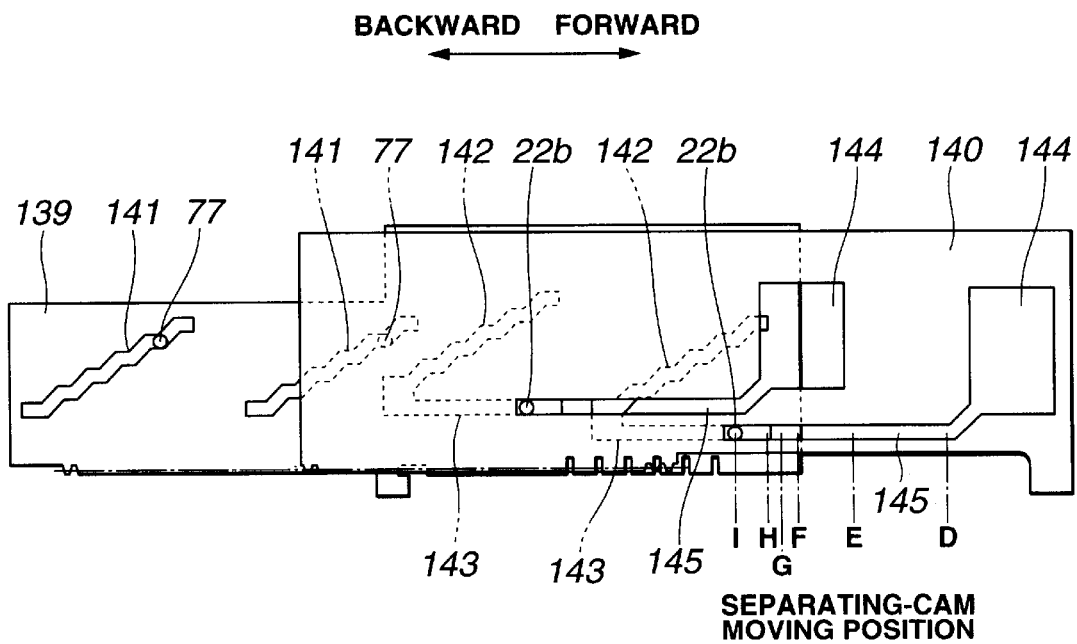
FIG. 23B is a view similar to FIG. 23A, for explaining operation of the operation means when the pin is in a position I or reproduction position, wherein the second disc is reproduced.
Figure 35A:
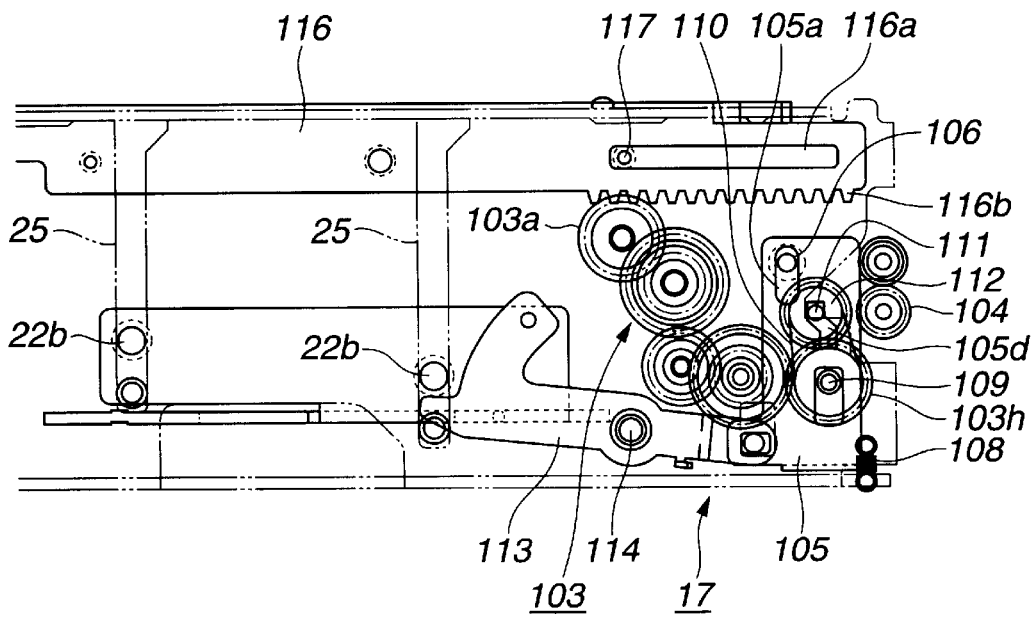
FIG. 35A is a view similar to FIG. 34, showing torque providing means when providing no toque.
Figure 35B:
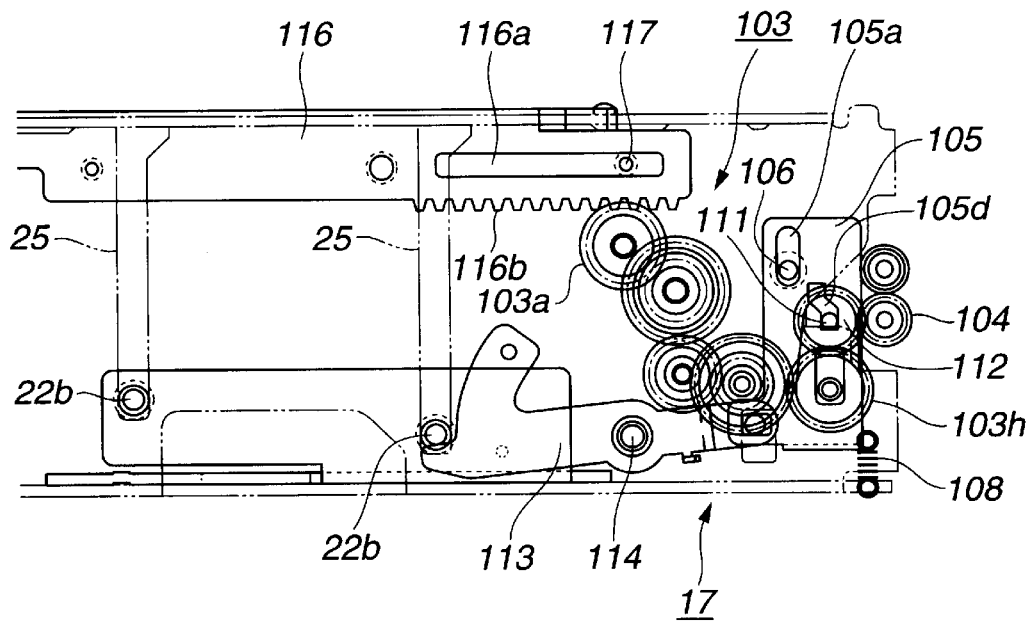
FIG. 35B is a view similar to FIG. 35A, showing the torque providing means when providing torque.
Figure 36:
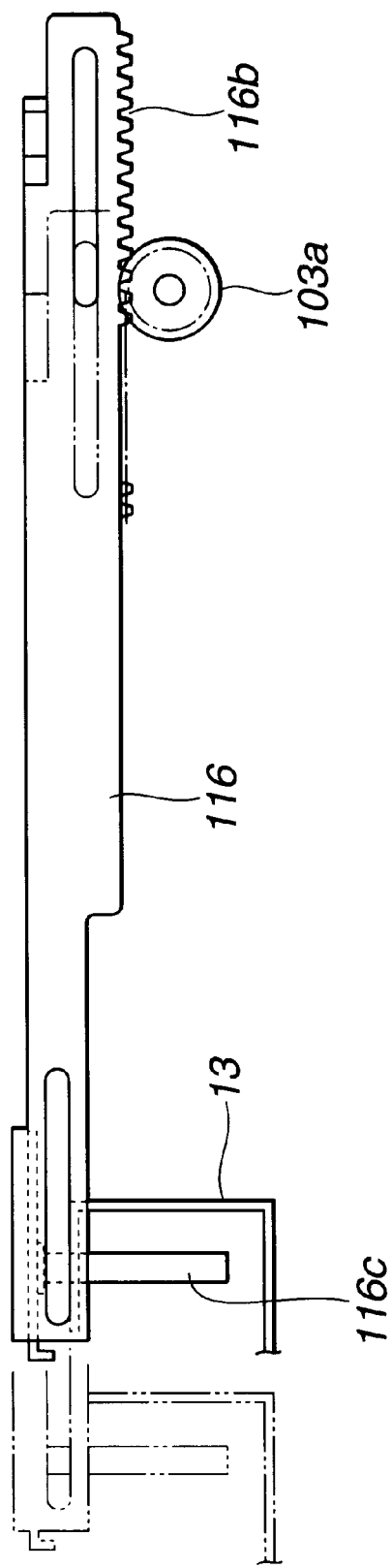
FIG. 36 is a view similar to FIG. 35B, showing the hold means when receiving torque.

When a sensor, not shown, senses the pins 22b arriving at the position G as shown in FIG. 23B, the transfer motor 46 starts to rotate. As described above, when switching to the reproducing mode, the pins 22b enter the bottom slits 143 to push downward the lever 113 of the torque providing means 17. Thus, the lever 113 is rotated counterclockwise about the pin 114 in the state as shown in FIG. 35A, so that the plate 105 is raised to rotate the lever 110 clockwise about the shaft 109, having the gear 112 meshed with the gear 103h and also with the gear 104 as shown in FIG. 35B. Therefore, rotation of the transfer motor 46 is transmitted to the slide bar 116 with the rack 116b through the drive shaft 30 and the gear train 103, moving the slide bar 116 backward as shown in FIG. 36. Then, since the engagement pin 116c of the slide bar 116 in a lower portion thereof is loosely engaged with the slot 13a, the hold means 14 are rotated forward. When the positioning pin 119 as shown in FIG. 17A goes beyond the position c as a point of inflexion, a biasing force of the toggle spring 120 operates in the opposite direction to rotate the positioning pin 119 to the position a as shown in FIG. 17A, introducing the chuck plate 99 and the turntable 97 together with the upper and lower arms 12, 13 above and below the selected CD as shown in FIG. 31. When viewing in the plan view, this is changed from the state in FIG. 37 to the state in FIG. 38. A limit switch, not shown, detects rotation of the hold means 14 to stop rotation of the transfer motor 46.

Figure 32:
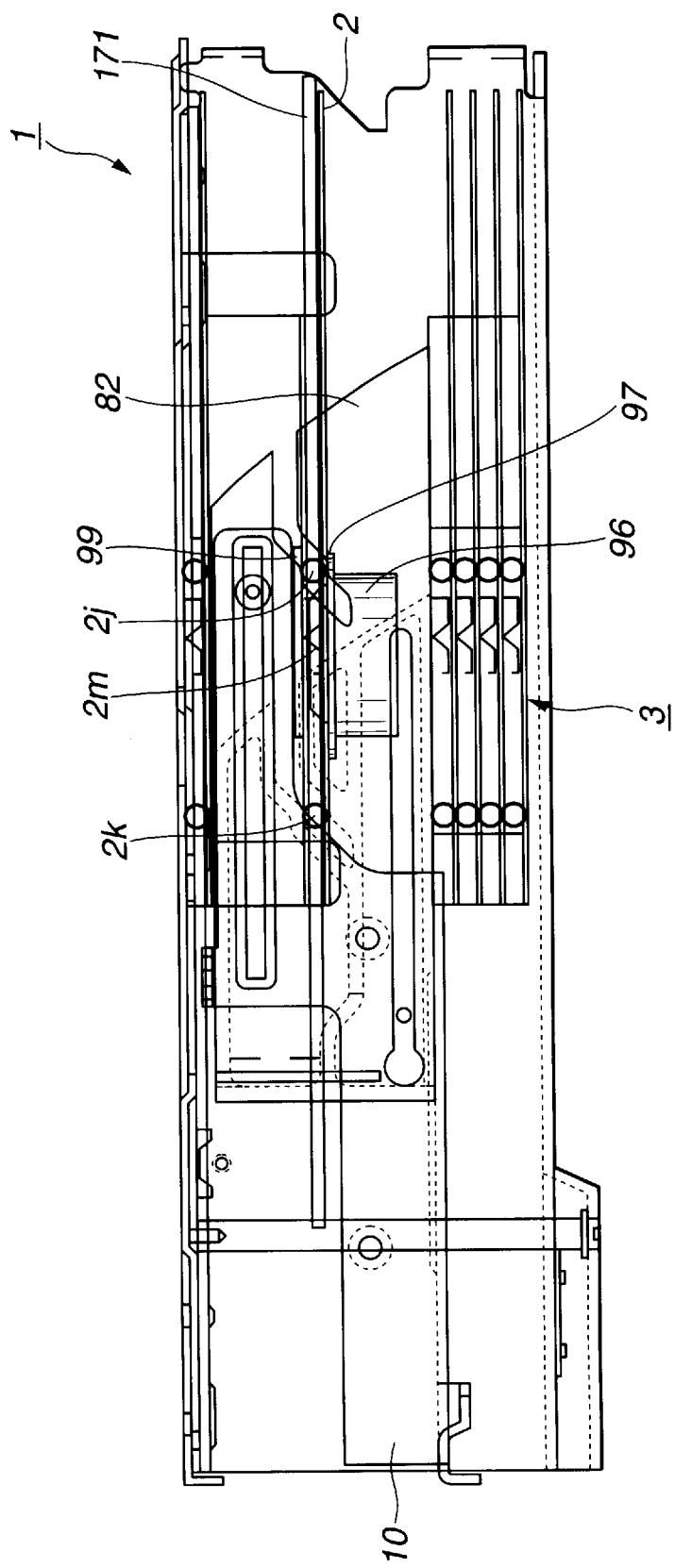
FIG. 32 is a view similar to FIG. 31, showing the reproduction disc placed on a turntable and held by the hold means after the tray is lowered.

When the outer slider 140 is moved forward to have the pin 22b in a position H as the forth step as shown in FIG. 23B, the pin 2k of the selected tray 2 is lowered in the middle engagement 82k, so that the selected tray 2 and CD are lowered to place the selected CD on the turntable 97 as shown in FIG. 32. Substantially simultaneously, the separating cam 82 is moved forward together with the outer slider 140 to operate the restriction means 18, which lower the upper arm 12 of the hold means 14 through operation of the hold spring 89, holding the selected CD between the turntable 97 and the chuck plate 99. Hold operation will be described in detail. When the pin 22b is in the position G, and the hold means 14 are in the standby position B, the guide pin 12a is positioned in the horizontal part 125a of the guide slot 125 as shown in FIG. 39A. When the hold means 14 are in the reproduction position A, the guide pin 12a is moved to the vertical part 125b of the guide slot 125 as shown in FIG. 40A. However, since the pin 127a cannot escape into the escape of the cam groove 82r of the separating cam 82 as shown in FIG. 28B, the guide pin 12a is blocked by the rear face of the restraining lever 127, and thus cannot lower. Then, when the pin 22b is moved to the position H, the separating cam 82 is also moved forward, so that the pin 127a can escape into the escape of the cam groove 82r as shown in FIGS. 28B and 40B. The pin 127a of the restraining lever 127 biased by the spring 128 is moved upward to the escape of the cam groove 82r of the separating cam 82, lowering the rear portion of the restraining lever 128. As a result, the upper arm 12 biased by the hold spring 89 is lowered as shown in FIG. 41 to hold the selected CD as described above.

The center of rotation of the hold means 14 is accurately positioned on the bottom plate 1e by arranging the support 92 provided on the bottom plate 1e through the hollow shaft 86 as the center of rotation of the hold means 14, and the positioning pin 119 is pressed against the pickup lifting/lowering stage 10 by the toggle spring 120 for holding, obtaining accurate positioning of the turntable 97 and the chuck plate 99 on the circumferential locus. Moreover, the guide supports 23 for guiding the tray 2 for holding the CD 171 thereon are also provided on the bottom plate 1e in the same way as the support 92, obtaining accurate positioning of the CD 171 on the bottom plate 1e. Therefore, the centers of CD to be reproduced, the turntable 97, and the chuck plate 99 coincide with each other, resulting in sure hold of the CD 171.

Figure 33:
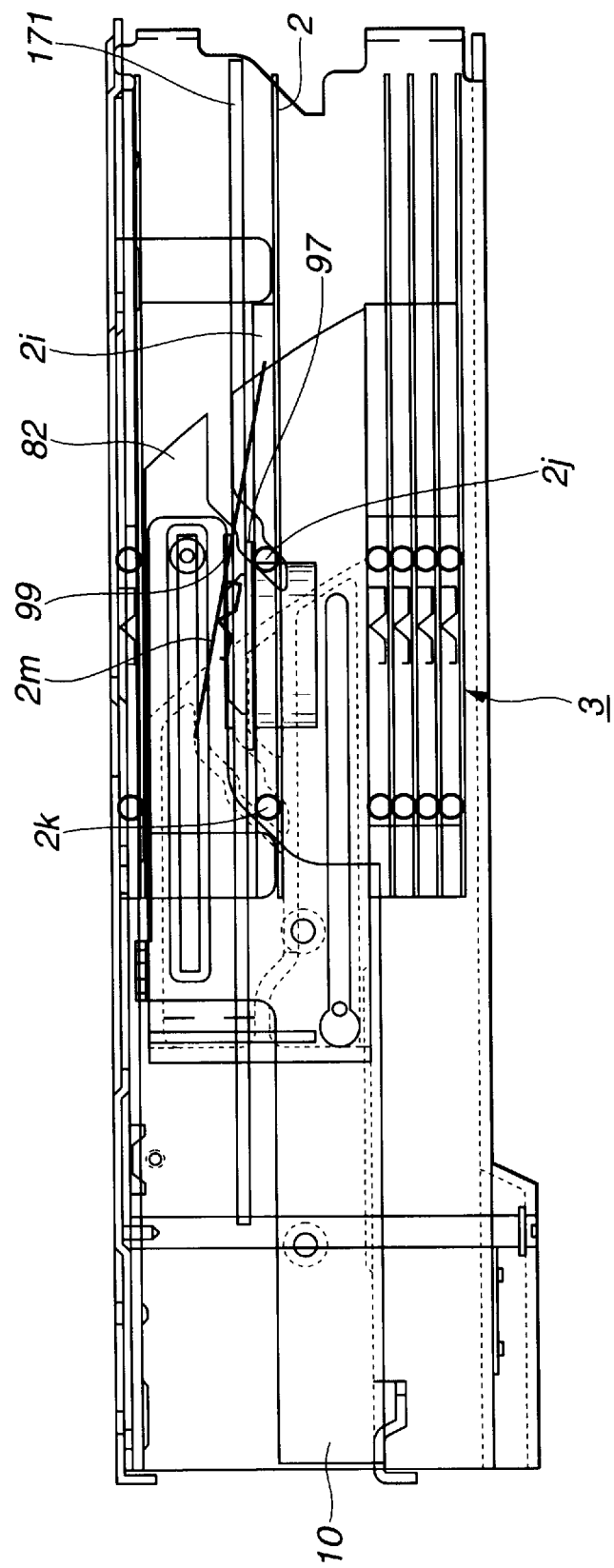
FIG. 33 is a view similar to FIG. 32, showing the reproduction disc separated from the tray after it is lowered.
Figure 34:
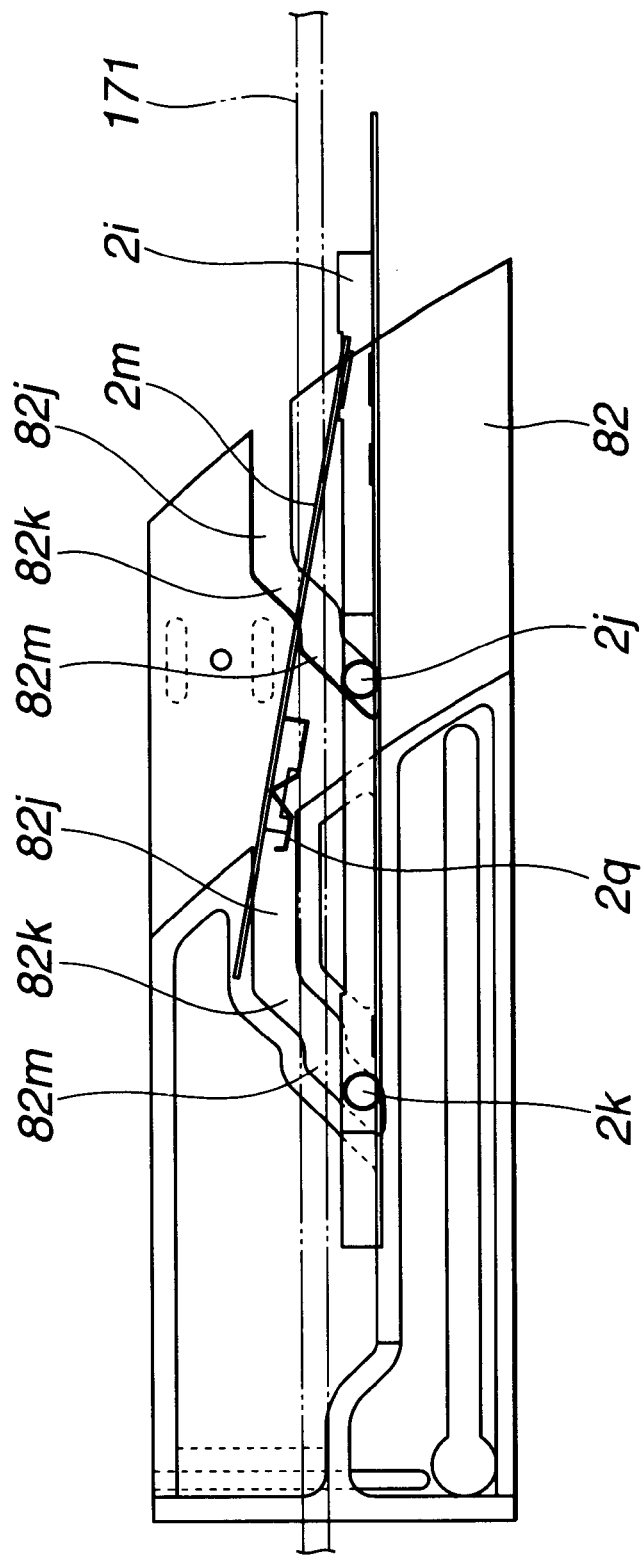
FIG. 34 is a view similar to FIG. 28B, showing the reproduction disc released by a plate spring of the tray pushed up upon reproduction.

When the outer slider 140 is moved forward to have the pin 22b in a position I as the fifth step as shown in FIG. 23B, the pin 2k of the selected tray 2 is lowered to the lower engagement 82m as shown in FIG. 28A. Thus, as soon as the selected tray 2 that has contacted the selected CD 171 is lowered as shown in FIG. 33 to separate therefrom, the receiver 2q of the plate spring 2m that has retained the selected CD 171 as shown in FIG. 34 is pushed upward by the lower face of the upper engagement 82j in the rear portion of the separating cam 82 to release the selected CD 171. At that time, the trays 2 below the selected tray 2 are retained by the lower face 82h of the separating cam 82, and the trays 2 above the selected tray 2 are biased downward by the coil spring 24, preventing the trays 2 from vibrating under the influence of a vibrating vehicle.

After holding the selected CD by the hold means 14 as described above, CD is reproduced with the hold means 14 held in the position A as shown in FIG. 38. With rotation of the spindle motor 96, CD is rotated through the turntable 97. Then, the scanning motor 165 of the pickup unit 16 is rotated, which is transmitted to the threaded shaft 164 to move the optical pickup 165 from the inside to the outside in the radial direction of CD, carrying out CD reproduction.

After CD reproduction, the threaded shaft 164 is reversed to return the optical pickup 162 to the initial position. Then, rotation of the scanning motor 165 is stopped, and also rotation of the spindle motor 96 is stopped. Subsequently, through reverse steps, the outer slider 140 is moved backward, and also the separating cam 82 is moved backward. When the pin 127*a* is returned from the position H to the position G as shown in FIG. 40A, the pin 127*a* of the restraining lever 127 that has been positioned as shown in FIG. 40B is disengaged from the escape of the separating cam 82 as shown in FIG. 40A to move downward, lowering the rear portion of the restraining lever 127. As a result, the guide pin 12*a* protruding outward from the hold means 14 is pushed upward along the vertical part 125*b* of the guide slot 125 to put the hold means 14 in the rotatable state. Subsequently, a sensor, not shown, senses upward movement of the guide pin 12*a* to rotate the transfer motor 46 in the direction opposite to the above direction, obtaining backward rotation of the hold means 14. When the positioning pin 119 that has been in the position b as shown in FIG. 17B goes beyond the position c as a point of inflexion, a basing force of the toggle spring 120 operates in the opposite direction to rotate the positioning pin 119 to the position b as shown in FIG. 17A, returning the hold means 14 to the position B or standby position. A limit switch, not shown, detects rotation of the hold means 14 to stop rotation of the transfer motor 46. The hold means 14 are biased backward by the toggle spring 120 even in the standby position B, failing to be influenced from the vibrating vehicle. Then, when the outer slider 140 is moved backward to return the pin 22*b* to the standby position D as shown in FIG. 23B, the separating cam 82 is also moved backward to lower all of the first to third trays 2, returning the trays 2 to the state as shown in FIG. 29 where the six trays are not separated.

When reproducing other CD than the second CD, the inner slider 139 is moved forward or backward in the state as shown in FIG. 23A to relatively move the pin 22*b* to any of the positions 1 and 3–6 assigned to the inner slider 139. Then, the outer slider 140 is slid to successively align the positions D–1 on the outer slider 140 to the pin 22*b*, obtaining repetition of the same operation as described above.

The illustrative embodiment is shown with regard to application of the disc recording and/or reproducing device to a disc player for reproducing sound. Alternatively, the disc recording and/or reproducing device may be applied to sound recording or recording/reproducing devices or image recording and/or reproducing devices. Moreover, the illustrative embodiment is shown with the trays placed vertically, optionally, with the trays placed horizontally. Furthermore, the disc has a size of 12 cm in the embodiment, optionally, it may have other size such as 8 cm.

Moreover, in the illustrative embodiment, the disc support plate is in the form of a tray, which is not limitative, however. The disc support plate may include a member for temporarily supporting passage of a disc between loading from the disc loading/unloading opening of the recording and/or reproducing device and placing on the tray.

The disc support plate according to the present invention, and the disc changer mechanism and the disc recording and/or reproducing device including such disc support plate produce the following effects:

1) The disc support plate of the present invention includes a resin portion formed by printing, allowing formation of a thinner resin portion of desired shape in a desired position compared with formation of the resin portion formed by coating;

2) The disc support plate of the present invention includes a substrate formed out of a metal plate with excellent mechanical strength, allowing a thinner disc support plate together with possible formation of a thinner resin portion by printing;

3) The disc support plate of the present invention includes a resin portion placed on a roughly whole surface of a substrate, obtaining a roughly whole surface of a disc supported by the resin portion;

4) The disc support plate of the present invention allows easy introduction of the disc onto the substrate by a first resin part placed along an edge on the disc loading side;

5) The disc support plate of the present invention includes a first resin part placed along an edge on the disc loading side, a second resin part placed along an edge on the disc unloading side, and a third resin part placed in the center between the first and second resin parts, wherein at least one of which can support part of a disc with other portions being in non-contact with the substrate;

6) The disc support plate of the present invention is constructed so that one of the first, second, and third resin parts is formed discontinuously, allowing a reduction in friction or contact resistance between that part and the disc;

7) The disc support plate of the present invention is constructed so that the third resin part formed in the center of the substrate allows smooth movement of the disc on the substrate;

8) The disc support plate of the present invention is constructed so that the third resin part arranged symmetrically on the substrate allows balanced support of the disc on the substrate;

9) The disc support plate of the present invention is constructed so that the thickness of the resin portion is 0.1–0.2 mm, obtaining easy printing of the resin portion and excellent follow-ability for some deformation of the substrate;

10) The disc support plate of the present invention is constructed so that the resin portions are arranged on both faces of the substrate, allowing protection of both the disc on the side of the upper face and the disc on the side of the lower face; and 11) The disc recording and/or reproducing device of the present invention includes a disc support plate having a resin portion placed on the substrate by printing, obtaining a thinner disc compartment, allowing a reduction in thickness and size of the whole device.

Having described the present invention with regard to the preferred embodiment, it is understood that the present invention is not limited thereto, and various changes and modifications can be made without departing from the scope of the present invention.

The entire teachings of Japanese Patent Application No. 2000-042836 are incorporated hereby by reference.

What is claimed is:

1. A disc support plate for a recording and/or reproducing medium, comprising:
    a substrate having a first tapered edge portion and a second edge portion, said substrate configured to allow a disc to be loaded onto the disc support plate from the first tapered edge portion to the second edge portion along a disc loading direction; and
    a resin portion provide only on the first tapered edge portion, the second edge portion and a line-shaped portion provided between the first tapered edge portion and the second edge portion.

2. The disc support plate as claimed in claim 1, wherein said substrate comprises a metal plate.

3. The disc support plate as claimed in claim 1, wherein said resin portion is provided on the first tapered edge portion, the second edge portion and the line-shaped portion without discontinuity.

4. The disc support plate as claimed in claim 1, wherein at least one of the resin portion provided on the first tapered edge portion, the resin portion provided on the second edge portion, and the resin portion provided on the line-shaped portion has discontinuity.

5. The disc support plate as claimed in claim 1, wherein said substrate is approximately 0.3 mm in thickness, and said resin portion is approximately 0.1–0.2 mm in thickness.

6. The disc support plate as claimed in claim 1, wherein said resin portion is formed on both faces of said substrate.

7. The disc support plate as claimed in claim 1, wherein the line-shaped portion connects the first tapered edge portion and the second edge portion.

8. The disc support plate as claimed in claim 1, wherein the line-shaped portion does not connect the first tapered edge portion and the second edge portion.

9. The disc support plate as claimed in claim 1, wherein the line-shaped portion extends along a center line of the substrate which is substantially parallel to the disc loading direction.

10. The disc support plate as claimed in claim 1, wherein the line-shaped portion includes first and second line-shaped portion which are provided substantially symmetrically with respect to a center line of the substrate which is substantially parallel to the disc loading direction.

11. A device for recording and/or reproducing a disc, comprising:

a casing defining an external shape of the device;

a disc support plate disposed in said casing, said disc support plate comprising:

a substrate having a first tapered edge portion and a second edge portion, said substrate configured to allow a disc to be loaded onto the disc support plate from the first tapered edge portion to the second edge portion along a disc loading direction; and a resin portion provided only on the first tapered edge portion, the second edge portion and a line-shaded portion provided between the first tapered edge portion and the second edge portion;

a disc compartment arranged in said casing to receive the disc on said disc support plate;

means for loading and unloading the disc from said disc compartment;

means arranged in said casing for reproducing the disc in said disc compartment; and means for operating at least one of said disc compartment and said reproducing means.

12. A changer mechanism for discs, comprising:

a plurality of disc support plates, each comprising:

a substrate having a first tapered edge portion and a second edge portion, said substrate configured to allow a disc to be loaded onto the disc support plate from the first tapered edge portion to the second edge portion along a disc loading direction; and a resin portion provided only on the first tapered edge portion, the second edge portion and a line-shaped portion provided between the first tapered edge portion and the second edge portion;

a disc compartment provided with said plurality of disc support plates, said disc compartment receiving the discs on said plurality of disc support plates; means for loading and unloading the discs from said disc compartment; and means for selecting one of the discs received in said disc compartment.

13. A device for recording and/or reproducing a disc, comprising:

a casing defining an external shape of the device;

a disc support plate disposed in said casing, said disc support plate comprising:

a substrate having a first tapered edge portion and a second edge portion, said substrate configured to allow a disc to be loaded onto the disc support plate from the first tapered edge portion to the second edge portion along a disc loading direction; and a resin portion provided only on the first tapered edge portion, the second edge portion and a line-shaped portion provided between the first tapered edge portion and the second edge portion;

a disc compartment arranged in said casing to receive the disc on said disc support plate;

a loader configured to load and unload the disc from said disc compartment;

a reproducer arranged in said casing and configured to reproduce the disc in said disc compartment; and an operation unit configured to operate at least one of said disc compartment and said reproducer.

14. A changer mechanism for discs, comprising:

a plurality of disc support plates, each comprising:

a substrate having a first tapered edge portion and a second edge portion, said substrate configured to allow a disc to be loaded onto the disc support plate from the first tapered edge portion to the second edge portion along a disc loading direction; and a resin portion provided only on the first tapered edge portion, the second edge portion and a line-shaped portion provided between the first tapered edge portion and the second edge portion;

a disc compartment provided with said plurality of disc support plates, said disc compartment receiving the discs on said plurality of disc support plates; a loader configured to load and unload the discs from said disc compartment; and a selector configured to select one of the discs received in said disc compartment.

* * * * *

UNITED STATES PATENT AND TRADEMARK OFFICE
CERTIFICATE OF CORRECTION

PATENT NO.   : 6,785,897 B2
DATED        : August 31, 2004
INVENTOR(S)  : Takizawa et al.

It is certified that error appears in the above-identified patent and that said Letters Patent is hereby corrected as shown below:

Column 6,
Line 1, change "metal-material" to -- metal material --.
Line 34, change "laterally The" to -- laterally. The --.

Column 9,
Line 26, change "sift" to -- slit --.

Column 13,
Line 40, change "2. and" to -- 2, and --.

Column 21,
Line 35, change "line-shaded" to -- line-shaped --.

Signed and Sealed this

Twenty-second Day of February, 2005

JON W. DUDAS
*Director of the United States Patent and Trademark Office*